US011610363B2

(12) United States Patent
Allen et al.

(10) Patent No.: US 11,610,363 B2
(45) Date of Patent: Mar. 21, 2023

(54) SYSTEMS AND METHODS FOR VIRTUAL REALITY ENVIRONMENTS

(71) Applicant: OBERON TECHNOLOGIES, INC., Ann Arbor, MI (US)

(72) Inventors: Scott Allen, Castle Rock, CO (US); Timothy Allen, Naples, FL (US)

(73) Assignee: OBERON TECHNOLOGIES, INC., Ann Arbor, MI (US)

(*) Notice: Subject to any disclaimer, the term of this patent is extended or adjusted under 35 U.S.C. 154(b) by 17 days.

(21) Appl. No.: 17/139,771

(22) Filed: Dec. 31, 2020

(65) Prior Publication Data

US 2022/0207817 A1 Jun. 30, 2022

(51) Int. Cl.
*G06T 15/20* (2011.01)
*G06F 16/955* (2019.01)
*G06T 19/00* (2011.01)
*G06F 16/908* (2019.01)

(52) U.S. Cl.
CPC ............ *G06T 15/20* (2013.01); *G06F 16/908* (2019.01); *G06F 16/9558* (2019.01); *G06T 19/006* (2013.01)

(58) Field of Classification Search
CPC ... G06T 15/20; G06T 19/006; G06F 16/9558; G06F 16/908
See application file for complete search history.

(56) References Cited

U.S. PATENT DOCUMENTS

| 7,050,102 B1 | 5/2006 | Vincent |
| 11,138,799 B1* | 10/2021 | Raghavan ............... G06T 15/50 |
| 2010/0241998 A1 | 9/2010 | Latta et al. |
| 2014/0337321 A1 | 11/2014 | Coyote et al. |
| 2015/0077326 A1 | 3/2015 | Kramer et al. |
| 2015/0348225 A1 | 12/2015 | Schreyer et al. |
| 2017/0237789 A1 | 8/2017 | Harner et al. |
| 2017/0337742 A1* | 11/2017 | Powderly ......... G06K 19/06009 |
| 2018/0307303 A1 | 10/2018 | Powderly et al. |
| 2021/0103449 A1 | 4/2021 | Terpstra et al. |

(Continued)

OTHER PUBLICATIONS

Lee, Gun A., Gerard Jounghyun Kim, and Chan-Mo Park. "Modeling virtual object behavior within virtual environment." Proceedings of the ACM symposium on Virtual reality software and technology. 2002. (Year: 2002).*

(Continued)

*Primary Examiner* — Xin Sheng
(74) *Attorney, Agent, or Firm* — Volpe Koenig P.C.; Daniel E. Rose

(57) ABSTRACT

In some aspects, the disclosure is directed to methods and systems for a dynamic, reconfigurable virtual reality environment with in-environment access to external data and resources. Implementations of these systems also provide an external mechanism for modifying other aspects of the virtual reality experience with no need to recode or compile the experience. This can alter the primary flow of the experience, change its behavior based on the specific user accessing it and add branded or customer-specific aspects to the application. The same level or environment can provide drastically different experiences for various users from beginners through experts, even allowing the option of random or ordered events, controllable by an instructor or administrator, through simple configuration.

16 Claims, 16 Drawing Sheets

(56) References Cited

U.S. PATENT DOCUMENTS

2021/0174602 A1    6/2021    Yoo et al.
2021/0406257 A1   12/2021   Friedman et al.

OTHER PUBLICATIONS

Vmware ("Examples of URIs", Feb. 3, 2020, https://docs.vmware.com/en/VMware-Horizon-HTML-Access/2103/html-access-installation/GUID-87C6148A-F758-4C9E-BE56-E1F26EA0D5D4.html) (Year: 2020).*

Boroumand ("A Web Developer's Guide to Browser Caching", 2017, https://medium.com/@codebyamir/a-web-developers-guide-to-browser-caching-cc41f3b73e7c) (Year: 2017).*

Foreign Search Report on PCT PCT/US2021/065784 dated Mar. 30, 2022.

Stack Overflow, "Access a Local Directory to Retrieve files from Localhost and Write Back", https://stackoverflow.com/questions/51932078/access-a-local-directory-to-retrieve-flies-from-localhost-and-write-back) 2018.

\* cited by examiner

| Event | Recorded time | Measured time | Distance | Score |
|---|---|---|---|---|
| Button 1 | 00:00:00 | 00:00:00 | 0 | 100 |
| Button 2 | 00:00:05 | 00:00:23 | 5 | 75 |
| Dial 1 | 00:00:30 | 00:01:04 | 3 | 85 |
| Dial 2 | 00:00:35 | 00:01:09 | 12 | 30 |

SYSTEMS AND METHODS FOR VIRTUAL REALITY ENVIRONMENTS

FIELD OF THE DISCLOSURE

This disclosure generally relates to systems and methods for virtual reality environments. In particular, this disclosure relates to systems and methods for providing dynamic virtual reality experiences with virtual objects having externalized and context sensitive links to data.

BACKGROUND OF THE DISCLOSURE

Virtual reality environments allow for training and certification of users and operators in environments that would be hazardous in reality, such as nuclear power or chemical processing plants, simulated emergencies such as fires or gas leaks, or other such environments. Such virtual reality environments may be highly immersive, with detailed simulations and photorealistic graphics, providing excellent training opportunities.

However, developing and programming such virtual reality environments and scenarios may be complex and time-consuming. Additionally, once programmed, the environments or scenarios are typically fixed, and difficult to change without reprogramming everything again. Currently, a large amount of information already exists from legacy training systems that is not yet integrated into such virtual reality environments. To add this data may similarly require reprogramming the entire environment. Accordingly, due to the complexity, expense, and time requirements for moving scenarios or training tools into a virtual reality environment, few developers are taking advantage of the advanced capabilities and functionality of virtual reality.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 4C is an example training and certification log for a virtual reality system for training and certification, according to some implementations;

The details of various embodiments of the methods and systems are set forth in the accompanying drawings and the description below.

DETAILED DESCRIPTION

For purposes of reading the description of the various embodiments below, the following descriptions of the sections of the specification and their respective contents may be helpful:

Section A describes embodiments of systems and methods for virtual reality environments; and Section B describes a computing environment which may be useful for practicing embodiments described herein.

A. Systems and Methods for Virtual Reality Environments

Virtual reality environments allow for training and certification of users and operators in environments that would be hazardous in reality, such as nuclear power or chemical processing plants, simulated emergencies such as fires or gas leaks, or other such environments. Such virtual reality environments may be highly immersive, with detailed simulations and photorealistic graphics, providing excellent training opportunities.

Figure 1A:
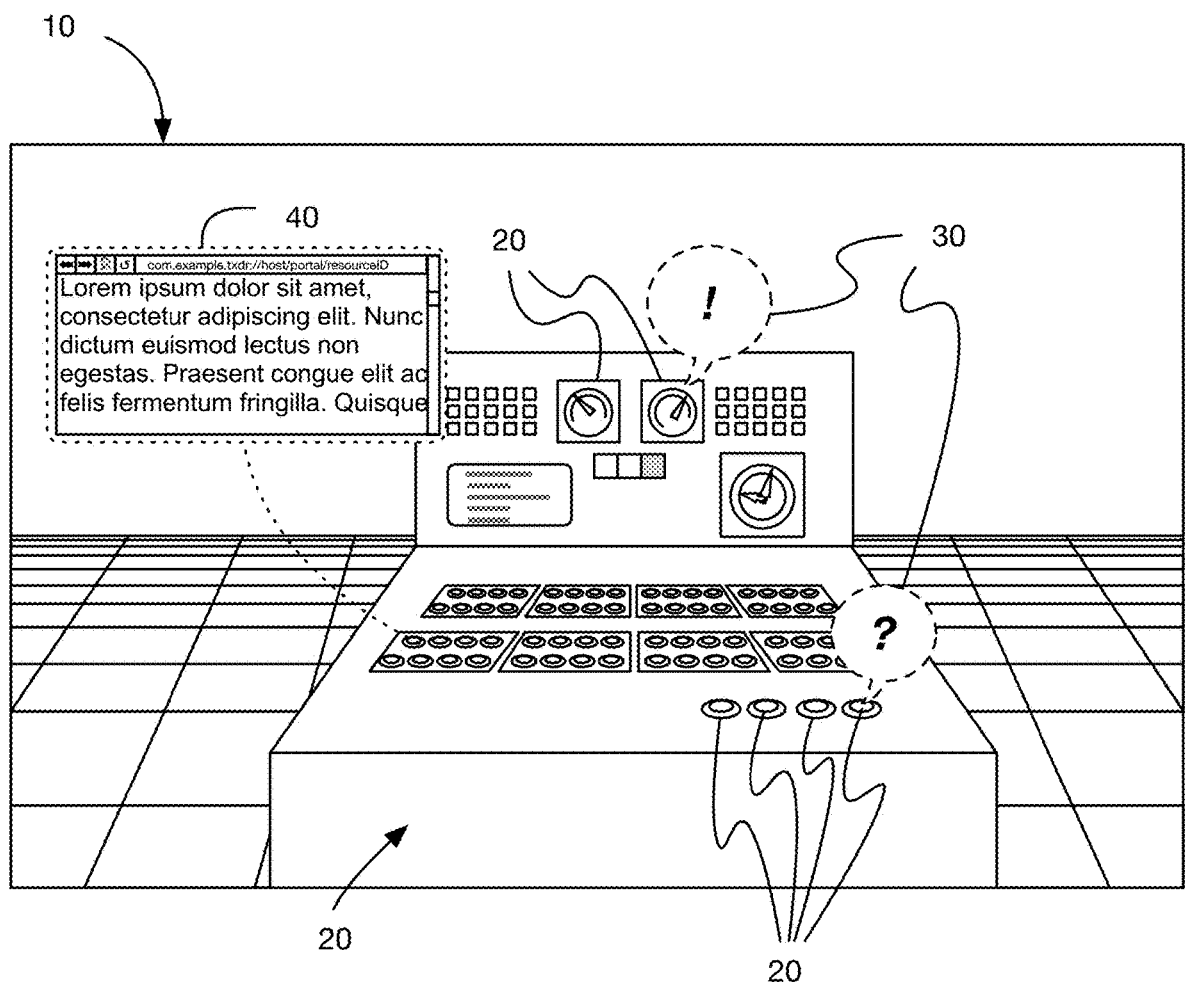
FIG. 1A is an illustration of a virtual reality environment for training and certification, according to some implementations.

For example, FIG. 1A is an illustration of a virtual reality environment 10 for training and certification, according to some implementations. The virtual reality environment 10 may comprise a three-dimensional environment and may be viewed from the perspective of a virtual camera, which may correspond to a viewpoint of a user or operator. In some implementations, the virtual camera may be controlled via a joystick, keyboard, or other such interface, while in other implementations, the virtual camera may be controlled via tracking of a head-mounted display (e.g. virtual reality goggles or headset) or similar head tracking such that the user's view within the virtual environment corresponds to their physical movements and orientation.

The virtual reality environment may comprise one or more objects 20, which may include buttons, levers, wheels, panels, screens, gauges, pipes, ladders, signage, or any other type and form of object. Objects 20 may have three-dimensional boundaries in many implementations, and may include textures, shading, or coloring for realism, including photo-realistic textures or images, in some implementations. Objects 20 may be interactive or allow a user to interact with the objects to control various aspects of a simulation. For example, in some implementations, a user may select an object (e.g. physically, in implementations where a user's movements are tracked, by reaching for the object; with a user interface device such as a joystick, mouse, tablet, pointer, or other device; verbally, according to a speech-to-command interface; visually, by directing the virtual camera towards the object and pressing a selection button or waiting a predetermined period; or any other such method), and various functions may be executed.

Developing and programming such virtual reality environments and scenarios may be complex and time-consuming. For example, in the example of FIG. 1A, a simple control panel may include dozens of individual objects with corresponding functions. Once programmed, the environments or scenarios are typically fixed, and difficult to change without reprogramming everything again. Making adjustments to the environment or scenario (e.g. to reflect updated hardware in a real environment) may require reprogramming the environment or recompiling an entire virtual reality application. Furthermore, a large amount of information already exists from legacy training systems that is not yet integrated into such virtual reality environments. To add this data may similarly require reprogramming the entire environment. Accordingly, due to the complexity, expense, and time requirements for moving scenarios or training tools into a virtual reality environment, few developers are taking advantage of the advanced capabilities and functionality of virtual reality.

The systems and methods discussed herein provide for a dynamic, reconfigurable virtual reality environment with in-environment access to external data and resources. In implementations of the systems and methods discussed herein, one of the most important aspects of training, the supplemental materials available to students, will be configurable by the end customer without the need for additional vendor engagement. Implementations of these systems also provide an external mechanism for modifying other aspects of the virtual reality experience with no need to recode or compile the experience. This can alter the primary flow of the experience, change its behavior based on the specific user accessing it and add branded or customer-specific aspects to the application. The same level or environment can provide drastically different experiences for various users from beginners through experts, even allowing the option of random or ordered events, controllable by an instructor or administrator, through simple configuration.

In some implementations, during creation and/or modification of the virtual reality environment or scenario, objects 20 may be tagged with metadata, including a unique identifier for the object (globally unique identifier or GUID, or a uniform resource identifier (URI) in some implementations). During compilation, a construct is generated that provides key/value pairs for endpoint URIs and other metadata. During runtime, objects having associated metadata may be annotated with icons 30 as shown in the example of FIG. 1A, or may be otherwise identified for interaction. Additional URIs can be designated for general "Help" files, as well as supplemental materials. Default values can be offered for these parameters during creation of the experience. Once packaged, this configuration construct may be made available for editing by users or administrators, without requiring recompiling of the virtual reality application. Changing values in the configuration may be reflected in the experience the next time it is launched and the construct (and associated key/value pairs) are read and interpreted. In some implementations, for each object that is encoded with these parameters, if a value exists (or a value of a certain type, indicating a help file or other information), an icon 30 may be displayed for the information. This may be limited to specific run modes, such as a training mode or guest mode. Responsive to the user selecting the icon, the system may instantiate an in-environment web browser or other interface 40, which may be rendered within the virtual environment to display a view of the corresponding content or resource, in a configurable presentation style, with relevant controls.

Thus, the systems and methods discussed herein provide for delivery of dynamic content in virtual reality, with no need to recreate existing content, while providing real time updates of information and access to legacy data, such as documents, audio, video and other file types, which can still be utilized, as-is. The systems and methods allow for updating of URI addresses or endpoint resources through reconfiguration of the external configuration construct, without requiring programming knowledge or the need to recode or recompile an executable application.

Figure 1B:
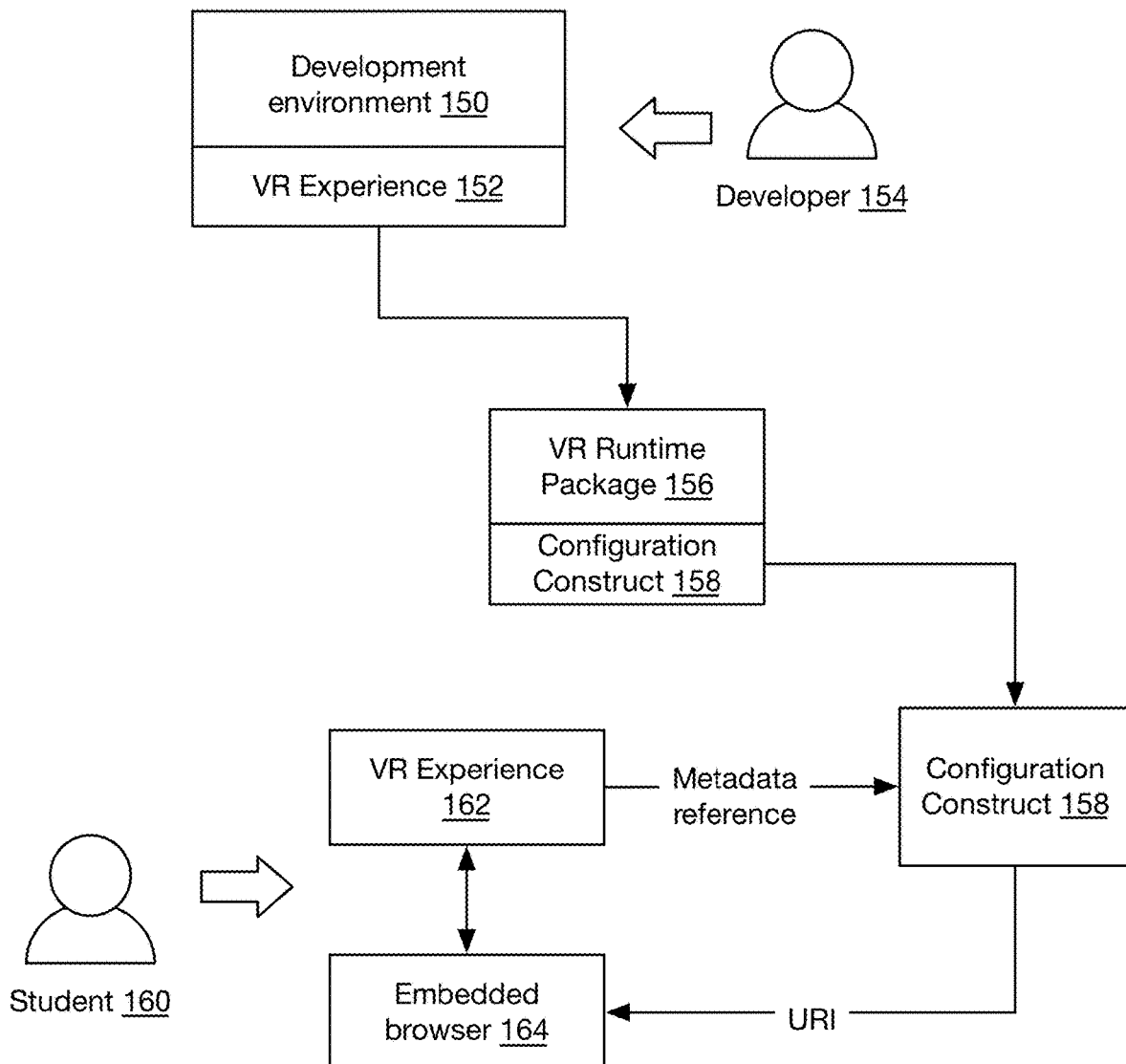
FIG. 1B is a logical block diagram of a virtual reality-based training system for training and certification, according to some implementations.

FIG. 1B is a logical block diagram of a virtual reality-based training system for training and certification, according to some implementations. A developer or designer 154 or other administrator (or a computing device under control of or operating on behalf of an instructor or other administrator) may utilize a development environment 150 to generate a virtual reality experience 152. The development environment 150 may comprise any suitable development application, libraries, or system for generating three-dimensional virtual reality content, and may comprise mapping engines, rendering engines, or other such applications or systems, such as the Unity engine developed by Unity Technologies of San Francisco, or the Unreal Engine developed by Epic Games of North Carolina, or any other such development kits or engines. The virtual reality experience 152 may refer variously to the virtual environment (e.g. including objects, textures, images, tec.), a scenario for the virtual environment (e.g. including events that occur responsive to triggers or time that change one or more objects within the virtual environment), or the compiled virtual reality application. The virtual reality experience 152 may thus comprise an application or data executable by an application for providing an immersive three-dimensional virtual environment, and may be developed in the development environment 150.

The virtual reality experience 152 may be compiled to generate the virtual reality runtime package 156 and a configuration construct 158. The virtual reality runtime package 156 may comprise compiled instructions or executable code for providing the virtual reality environment. As discussed above, once compiled, the virtual reality environment is typically self-contained and fixed, requiring recompilation for any changes. However, through the use of the linked configuration construct 158, implementations of the systems and methods discussed herein may allow for dynamic modification of the virtual reality environment or scenarios.

Specifically, objects within the environment and specified in the runtime package 156 may be associated with unique identifiers, which may be referred to as resource identifiers or GUIDs. The configuration construct 158 may comprise an index, array, database, or other data structure associating resource identifiers or GUIDs with addresses (URIs) of external resources. As a student 160 or other user (or a computing device operated by or on behalf of a student or other user) executes the compiled virtual reality experience, their computing device may identify metadata comprising resource identifiers or GUIDs of objects within the virtual environment; read the linked URI addresses from the configuration construct 158; and retrieve the associated resource for display within an embedded browser or renderer 154 in the virtual environment. To dynamically change the scenario or environment, the configuration construct 158 may be edited without changing the compiled virtual reality runtime package 156, allowing for selection and embedding of different resources, triggering of additional functions, etc. In some implementations, the external linked resource may be changed or replaced without changing the configuration construct, similarly resulting in embedding of different resources. In some implementations, every object within an environment or scenario may have a unique resource identifier or GUID, but may not necessarily have a linked resource URI in the configuration construct 158; such linked resources may be added after compilation, adding additional functionality or data to the virtual environment without requiring modification of the runtime package or code.

Figure 2A:
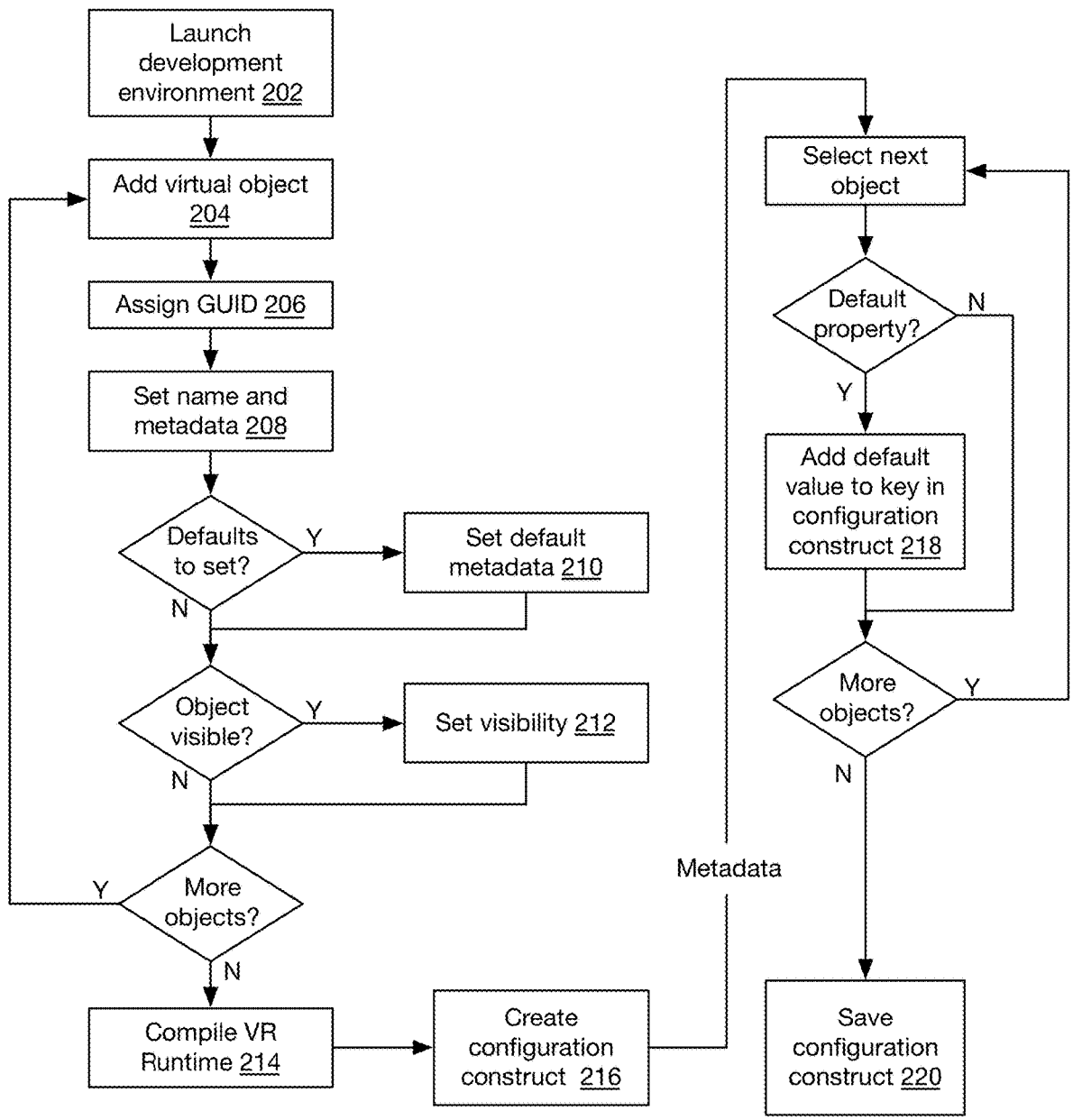
FIG. 2A is a flow chart of a method for virtual reality-based application development and deployment, according to some implementations.

FIG. 2A is a flow chart of a method for virtual reality-based application development and deployment, according to some implementations. At step 202, a computing device of an developer or designer or other operator may launch a development environment, such as a software development kit or other such engine for generating and configuring a virtual reality environment or scenario. At step 204, the developer or designer may add a virtual object to the environment or scenario. At step 206, a unique identifier may be assigned for the virtual object (e.g. either randomly, incrementally, as a hash of data of the object, etc.), and at step 208, other metadata and/or names for the object may be set (e.g. including locking settings such as whether the object may be manipulated or interacted with, animations, or other such data). In some implementations, default metadata may be utilized and/or may be set at step 210 to be applied to any virtual objects for which object-specific or custom metadata is not specified (step 210 may occur as shown, and/or after step 202 or before step 214 or at any other appropriate point prior to compilation of the runtime). In some implementations, a visibility of the object or the linked resource may be set in metadata at step 212. Steps 204-212 may be repeated iteratively for additional objects.

Once all objects have been added, at step 214, the virtual reality runtime code may be compiled into an application or execution package. The package may include executable code as well as resources required for execution, such as textures, images, sounds or other media content, etc. In some implementations, during compilation, one or more of the following may occur:

- The system identifies and collects all objects that will be processed, ignoring those with a specific metadata tag value;
- For those objects that will be processed, the system collects the metadata for each; and
- If the metadata has a value already set on the object, this value is used as the default in the configuration construct under the specific information type, for example Info, Supplement or Help. Objects may have an associated type to define the values that can be stored in its associated properties or the underlying operations that can be performed on it.

Metadata values can be set as locked, to prevent the overwriting of values; and/or may be designated as public or private to identify if the metadata value should be scoped into lower levels in a hierarchy, or only in the current context. Upon completion of the process, the configuration construct is saved as the virtual reality package or application.

At step 216, the configuration construct may be generated, comprising associations between each GUID and either default resources (or other metadata, e.g. specified at step 210) or object-specific resources. Such associations may comprise key-value pairs of the GUID and an address (URI) or identifier of an external resource. For example, in some implementations, a URI may comprise a private URL scheme (e.g. a custom scheme such as "tdxr://" rather than "http://" or other common schemes) to allow for interception of requests by or redirection of requests to an agent or URI handler. The URI may further comprise an identifier of a host server (e.g. a server at a domain, such as tdxr.example.com, and may include a port number or other addressing information), a portal identifier, and/or a resource identifier. In some implementations, the URI may comprise an action for use in a query or request for the associated resource, such as "download" or "run".

Figure 2B:
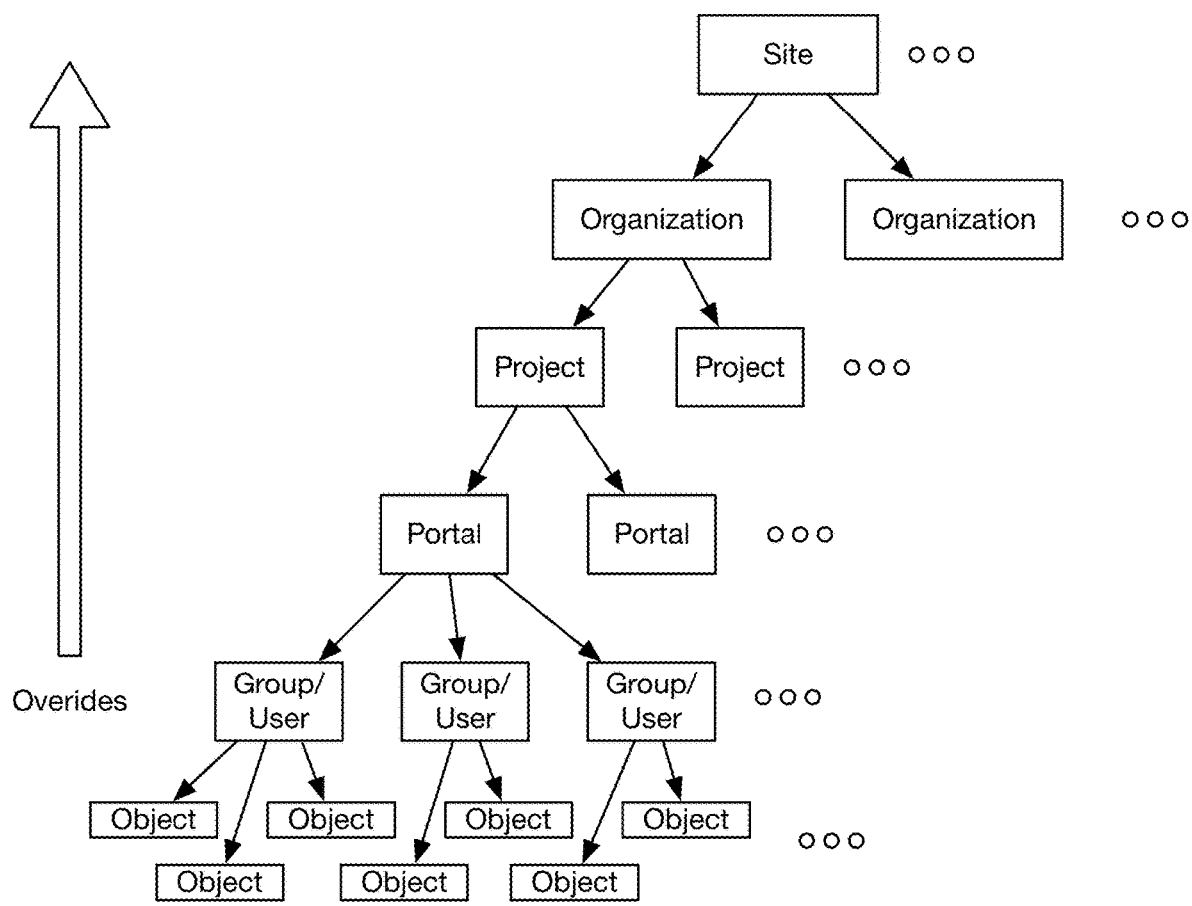
FIG. 2B is a tree diagram of a logical hierarchy for virtual reality-based application development and deployment, according to some implementations.

The host, portal, and resource identifiers may be used to organize objects within the system. For example, the host, portal, and resource identifiers (and in some implementations other identifiers) may be part of a taxonomy and classification system that organizes all three-dimensional objects in the projects into categories or types. A set of templates are created for objects represented in the virtual environment. These templates include a GUID or other identifier, a name for the object, and other metadata that is common to the specific object type. For example, referring briefly to FIG. 2B, illustrated is a tree diagram of a logical hierarchy for virtual reality-based application development and deployment, according to some implementations. As shown, objects may be associated with leaf nodes of a hierarchical tree, with higher layers or levels including a group/user layer; project layer; portal layer; organization layer; and site layer. In some implementations, these layers may be defined as:

Site: This level may be associated with the application administrator. Since the virtual reality applications or environments may be provided as a software-as-a-service (SaaS) model, this layer may represent a top-level vendor who maintains the entire site and all of the organizations that are served by the content;

Organization: This level may be associated with an organization or customer, and may be administered by a representative of the organization;

Project: Projects are cohesive grouping of content. Since that content can be shared in many locations, known as portals, this level sets metadata that should be there, by default, regardless of the context in which the information is presented;

Portal: This level may comprise collections of projects, and configurations can be changed to override higher level settings, providing an experience that is unique to the collection; and User/Group: At this level, a configuration construct can be added to provide distinctive modifications specifically for users or groups of users, based on login environment, providing URLs and metadata that are tailored for the individual experience.

There are also various categories of metadata that are tracked at different levels in the system, such as:

Identity, including user names or login names; display names; or other SAML/LDAP values;

Experience, including properties describing the details of the experience, as a whole, such as geographic location, VR capabilities, controller types, training methodology, etc.; and Objects, including metadata related to aspects of the virtual objects within the environment.

This metadata guides the behavior of the experience by managing launch parameters based on the loaded data, to direct which links are presented, the training mode that the experience launches in, and other relevant actions. If metadata is not set for a required property, in some implementations, a menu may be presented to allow the user to choose the metadata options for that instance of the application.

Returning to FIG. 2A, the configuration construct may be populated for each virtual object or element by determining whether default properties should be applied to the element (e.g. for elements for which custom properties were not set, but were set to be visible at step 212 in some implementations); and at step 218, adding default values to keys for the elements in the configuration construct. Default values may specify generic help messages or other interactions, or any other such resources. This process may be repeated for each virtual object or element, and once complete, the configuration construct may be saved in connection with the virtual reality runtime at step 220.

Accordingly, the compiled virtual reality experience includes the configuration construct as an external object that can be edited and placed back in the package. An administrator or instructor has the ability to modify this file, changing metadata and endpoint URI addresses by identifying the relevant object, finding the specific metadata property, and modifying the value parameter. Changing values in the configuration will be reflected in the experience the next time it is launched. For each object that is encoded with these parameters, if a value exists, the icon will be visible for the information while in modes where it is acceptable to display. Selecting the icon will provide a view of the content, in a configurable presentation style, with relevant controls. Also, other metadata can be manipulated at various levels in the path to delivery to alter the virtual experience, enabling different users to execute the same virtual reality application, but interact with a vastly different training event.

Figure 2C:
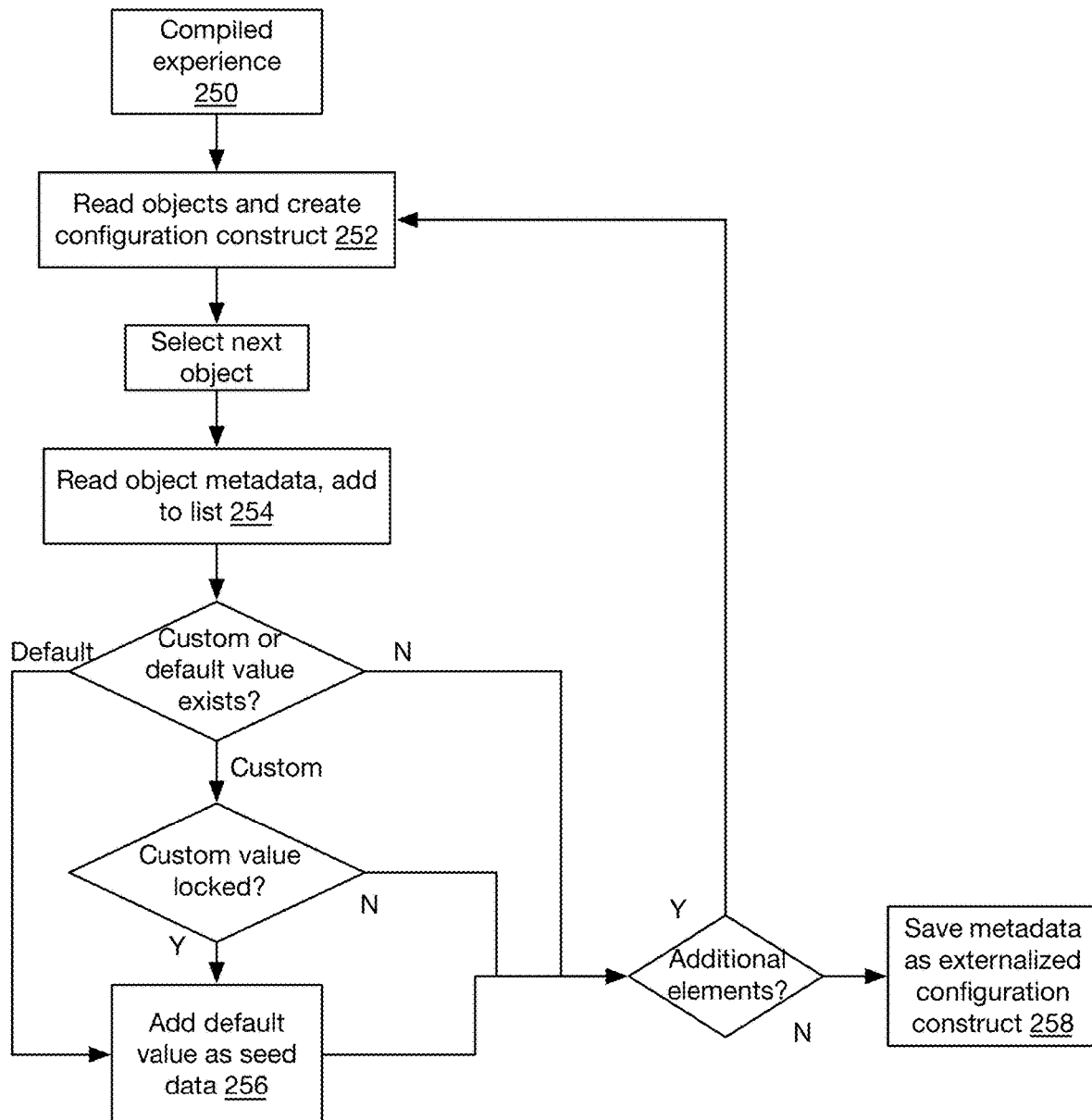
FIG. 2C is a flow chart of a method for generation of configuration constructs for virtual reality-based application development and deployment, according to some implementations.

FIG. 2C is a flow chart of another method for generation of configuration constructs for virtual reality-based application development and deployment, according to some implementations. The method of FIG. 2C is similar to and expands on the process discussed above. At step 250, the computing device may receive the compiled virtual reality experience (e.g. application or data file generated at step 214). At step 252, the objects may be read from the virtual reality experience (e.g. extracted from object code, XML, data, or other such data structures), and the configuration construct may be generated (e.g. as a data array or data structure with keys corresponding to each object's GUID. For each object, custom metadata of the object (e.g. added by the administrator or trainer) may be read and added in association with the object's GUID in the data structure at step 254. If custom metadata does not exist, and a default metadata value exists (e.g. for the user group corresponding to the project; or if default metadata does not exist at that layer, for the portal corresponding to the project; or if metadata does not exist at that layer, for the project corresponding to the project, etc.), then at step 256, this default data may be added in association with the object's GUID. Similarly, if custom metadata exists, but the value is locked at the default level (e.g. the state of the metadata object will not allow overriding of the default value, such that the default value should be used), then at step 256, the default data may be added in association with the object's GUID. This may be repeated iteratively for each additional object. Finally, the metadata may be save as an externalized (e.g. separate from the virtual reality runtime) configuration construct at step 258.

Figure 2D:
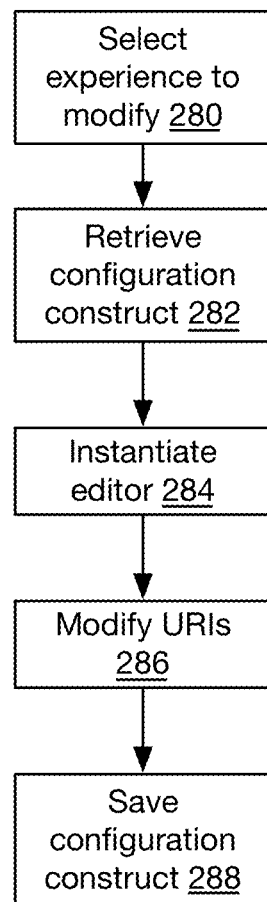
FIG. 2D is a flow chart of a method for modification of configuration constructs for virtual reality-based application development and deployment, according to some implementations.

As discussed above, the compiled virtual reality experience includes the configuration construct as an external object that can be edited and placed back in the system representation of the VR experience (e.g. container or other compiled structure). An administrator or developer has the ability to modify this file, changing metadata and endpoint URIs by identifying the relevant object, finding the specific metadata property, and modifying the value parameter. When editing is completed, the construct is bundled back into the system representation of the experience. FIG. 2D is a flow chart of a method for modification of configuration constructs for virtual reality-based application development and deployment, according to some implementations. At step 280, an administrator may select a virtual reality experience (and associated configuration construct) to modify; and at step 282, the configuration construct may be retrieved. An editor interface may be launched at step 284, which may include a specialized application, or a text editor (e.g. for implementations in which the configuration contrast is stored in a human readable format such as XML data, comma-separated values, or a spreadsheet). At step 286, the administrator may modify the URIs and other metadata of the configuration construct, and at step 288 may save the modified construct. Subsequently, when running the virtual reality runtime, the modified construct may be retrieved and the modified URIs and other metadata utilized for retrieving content or resources.

The final stage of the process is executing the runtime application to allow students to run a virtual training session. Upon execution of the virtual reality experience, the configuration construct is read to seed the data for all of the metadata values, allowing the correct endpoints to be identified and displayed during runtime. All information, supplementary and help icons are displayed on objects that have corresponding metadata for those keys.

Figure 3A:
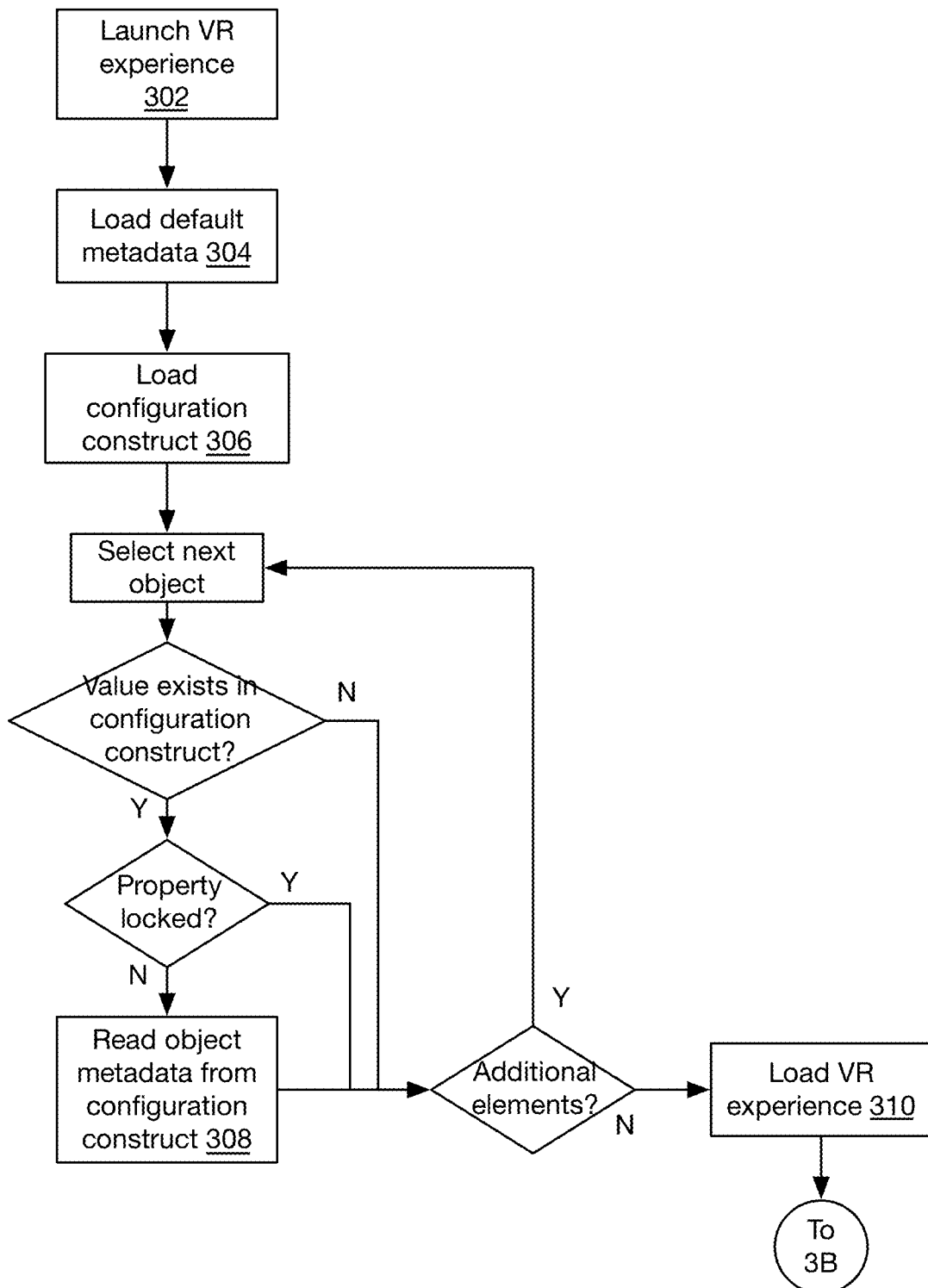
FIGS. 3A-3B are a flow chart of a method for providing an interactive virtual reality environment, according to some implementations.
Figure 3B:
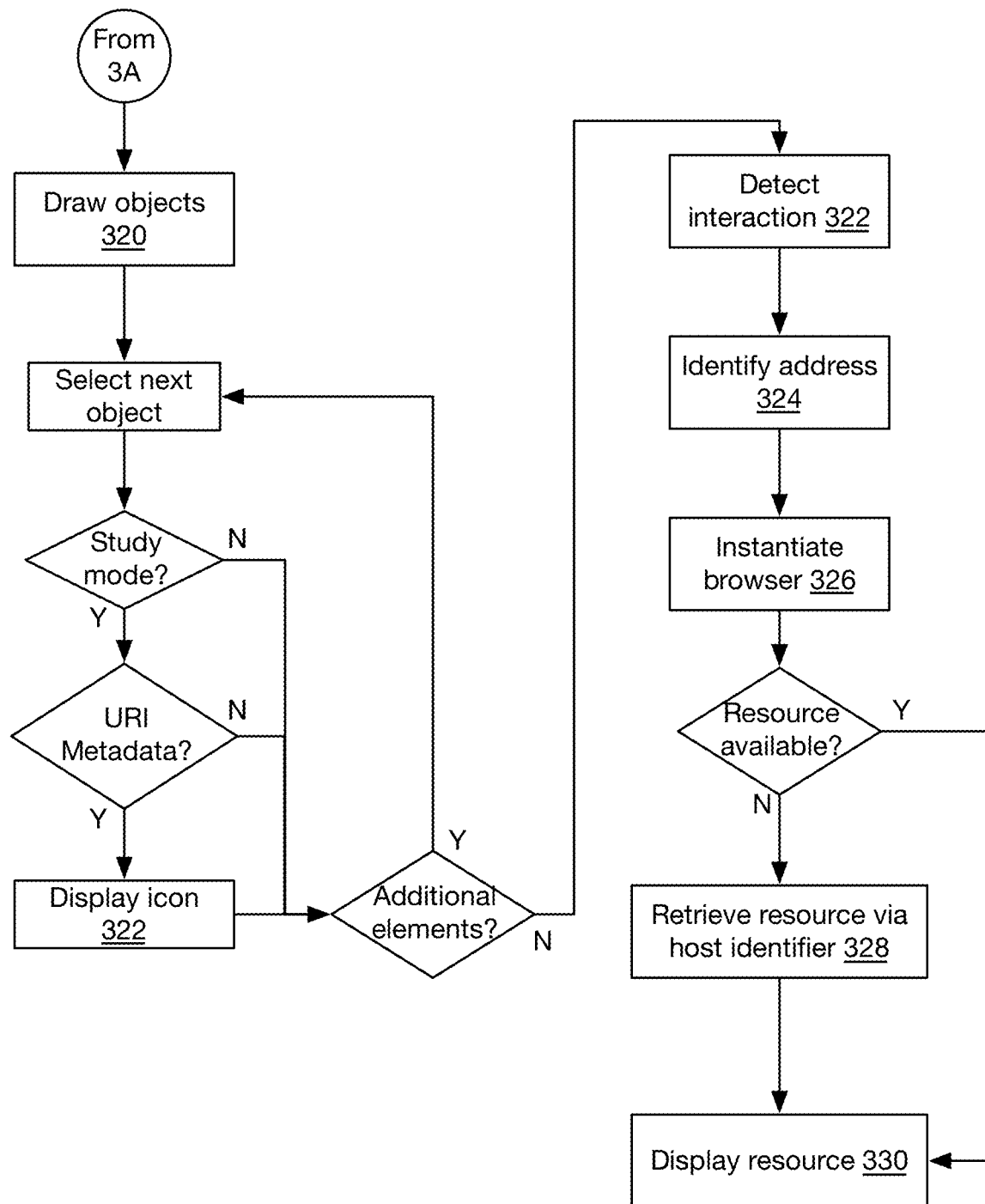

FIGS. 3A-3B are a flow chart of a method for providing an interactive virtual reality environment, according to some implementations. At step 302, a virtual reality experience may be launched. The virtual reality experience may be launched as an executable file or as an address (URL or URI) of a data file or executable file for the virtual reality experience, which may be downloaded and retrieved. For example, in some implementations, a browser application or other application on a client device may read a single argument as a URL or URI in a private scheme (e.g. com.example.txdr: address), or a file path to an executable file. If the argument is an address in a private scheme, a local agent or handler may receive the address via redirection from the browser or operating system (e.g. by registering the private scheme) or interception of the request from the browser.

Specifically, in order to facilitate certain operations between portal pages or resources and native platform applications, a private URL scheme, com.example.tdxr or a similar scheme, may be used in some implementations. The scheme name may comply with IETF RFC 7595 to avoid name-space collision with registered URL schemes or other private schemes in many implementations. The scheme URLs may be used to identify extended reality resources without regard to a particular storage system or retrieval location, so that the same tdxr URL or URI can refer to a resource on a local filesystem or in a remote data server.

In many implementations, the private scheme URL may conform to the following template: com.example.tdxr://{xr-host}/{xr-portal}/{xr-id}(?action)

xr-host may identify an authority (e.g. hostname plus port number) of a remote data server where the portal is found;

xr-portal is the portal that owns the XR resource; and xr-id is a path component that uniquely identifies the XR resource within its owning portal. The xr-id may be any valid URL path component, but it is recommended to be a human-readable identifier for the resource. It does not have to match a file name or directory, but could be derived from one.

In some implementations, the optional action query parameter may have one of the values download or run. The default value may run, in which case the parameter may be omitted. For example, the link <a href="com.example.tdxr://xr.example.com/xr-demo/very-cool-vr?download"> may be interpreted by an appropriate protocol handler to download the VR experience with id very-cool-yr from the xr.example.com/xr-demo portal.

In some implementations, to avoid unnecessary downloads, the handler or local agent may scan the local library or data store for an extended reality experience (e.g. one incorporating the external configuration construct and with links to external resources) with the given xr-id from the specified portal (e.g. the relevant hierarchy layers, other than the site and, in some implementations, organization layers may be duplicated on the local storage or relevant resources corresponding to the user, group, portal, or project layers may be stored or cached locally). If one exists, and the URL action is not "download", the handler may launch the experience. If the file does not exist or the URL action is "download", the handler may make a download request to the portal given by xr-host/xr-portal for the experience. Once downloaded, the package may be decompressed and, in some implementations, decrypted. If the action is "run", the downloaded experience may be launched (conversely, if the action is "download", the user may be notified that download is complete and provided with a prompt to manually launch the experience).

To launch the application, in some implementations, the file may be verified (e.g. checking for corruption); and the system may verify that the file is licensed to run in the current context (e.g. user and/or platform). In some implementations, if the experience includes a settings file, in some implementations, a form may be displayed to collect runtime context information as specified in the settings file. The VR experience may then be launched as a new process. At step 304, default metadata may also be loaded for use with objects lacking specific or custom metadata.

At step 306, the configuration construct may be loaded and read to seed the data for all of the metadata values, allowing the correct endpoints to be identified and displayed during runtime. Configuration constructs, being stored separately, may be downloaded separately from the VR runtime application or data. In some implementations, during the process of downloading or running an experience, only those components of the experience that have changed (based on a comparison of the data) may be downloaded (e.g. with incremental or differential updates), such as new icons, revised configuration constructs, or the experience itself if modified. During execution of the experience, all information, supplementary and help icons may be displayed on objects that have corresponding metadata for those keys. For example, for each object, the system may identify its GUID and determine whether a value exists in the configuration construct for that GUID. If not, the default metadata may be utilized; otherwise, the system may determine whether the object has a locked property. If so, the object may be unavailable for interaction. This may be due to the mode of operation, for example (e.g. in test modes, additional help resources may be unavailable that would be available in study or guided modes), or may be due to a scenario (e.g. where the user is being trained in performing a sequence of operations, some objects or elements may initially be locked and unlocked later in the scenario). The modes (e.g. Study, Guided, and Test, for example) may be specified within the metadata and may have different values for different modes, in some implementations (e.g. different visibility during different modes), such that values can be shown or ignored based on the modes supported for that metadata property. For instance, in a testing mode, help icons may be disabled. However, information icons may still be enabled or visible to provide answers to questions or actions for which incorrect responses have been given. Icon visibility within the experience may be guided by a number of environmental and metadata factors, to aid in maintaining a realistic setting. Voice commands, controller actions and key combinations are three examples, and/or in some implementations, metadata may specify how information about that object is displayed, such as Always On, Always Off, On Failure, Distance, etc.

If the object is not locked, then at step 308, the object metadata may be read from the configuration construct and applied to the object. Once every object has been processed, at step 310, the virtual reality experience may be loaded and executed.

Continuing to FIG. 3B, at step 320, objects in the virtual environment may be drawn (e.g. at coordinates or positions according to the configuration of the environment). For each object, the system may determine whether the simulation is in a mode in which icons may be displayed (e.g. according to the metadata for that object), and whether such metadata exists; if so, then at step 322, an icon may be displayed in the virtual environment to indicate that information is available (e.g. as in FIG. 1A above). This may be repeated for each additional object, and may be repeated as the simulation or scenario progresses (e.g. to enable icons for subsequent steps or disable icons for steps that have been performed, to reduce visual clutter).

At step 322, during execution, the system may detect an interaction of the user with an object. The interaction may comprise pressing a button, pulling lever, rotating a knob or dial, etc., and may be performed in any suitable manner (e.g. by tracking a hand position of the user and determining an intersection between a corresponding hand position of a virtual avatar of the user and the object; by tracking a position of a virtual "laser pointer" or other device; by selection via a mouse, keyboard, joystick, or other interface element; via a verbal command received a speech-to-text or speech-to-command engine (e.g. "press blue button" or "turn dial to 20"); by selection via head tracking (e.g. looking at a particular button and holding the user's head position for several seconds); or any other such method or combination of methods). Upon detecting an interaction with an object, at step 324, a local agent or handler may identify in the metadata for the object a resource path or address and identifier for a resource to display. In some implementations, the metadata may be loaded at runtime from the configuration construct and values applied to metadata of the objects such that the address may be read directly from the object metadata. In other implementations, the metadata of the object may comprise a GUID and the local agent or handler may read the corresponding metadata values from the configuration construct responsive to detection of the interaction.

At step 326, the handler or local agent may instantiate a browser within the virtual environment. For example, the handler or local agent may execute a web browser, such as a Chromium-based web browser, with a viewport displayed within the virtual environment (e.g. as a floating window at a position proximate to the virtual object, within a virtual representation of a tablet computer or other computing device, within a model menu, or any other representation within the virtual environment). The browser may attempt to retrieve the resource at the identified path and address, first from a local storage or cache. If the resource is not available locally, then at step 328, the browser may retrieve the resource at the identified host, path, and address (and in some implementations, store the resource locally). The resource may then be displayed by the browser at step 330. Resources may be in any type and form and include videos, images, text, instruction lists, checklists, guides, help information, or any other type and form of useful information that may be associated with an object within a virtual environment.

Figure 4A:
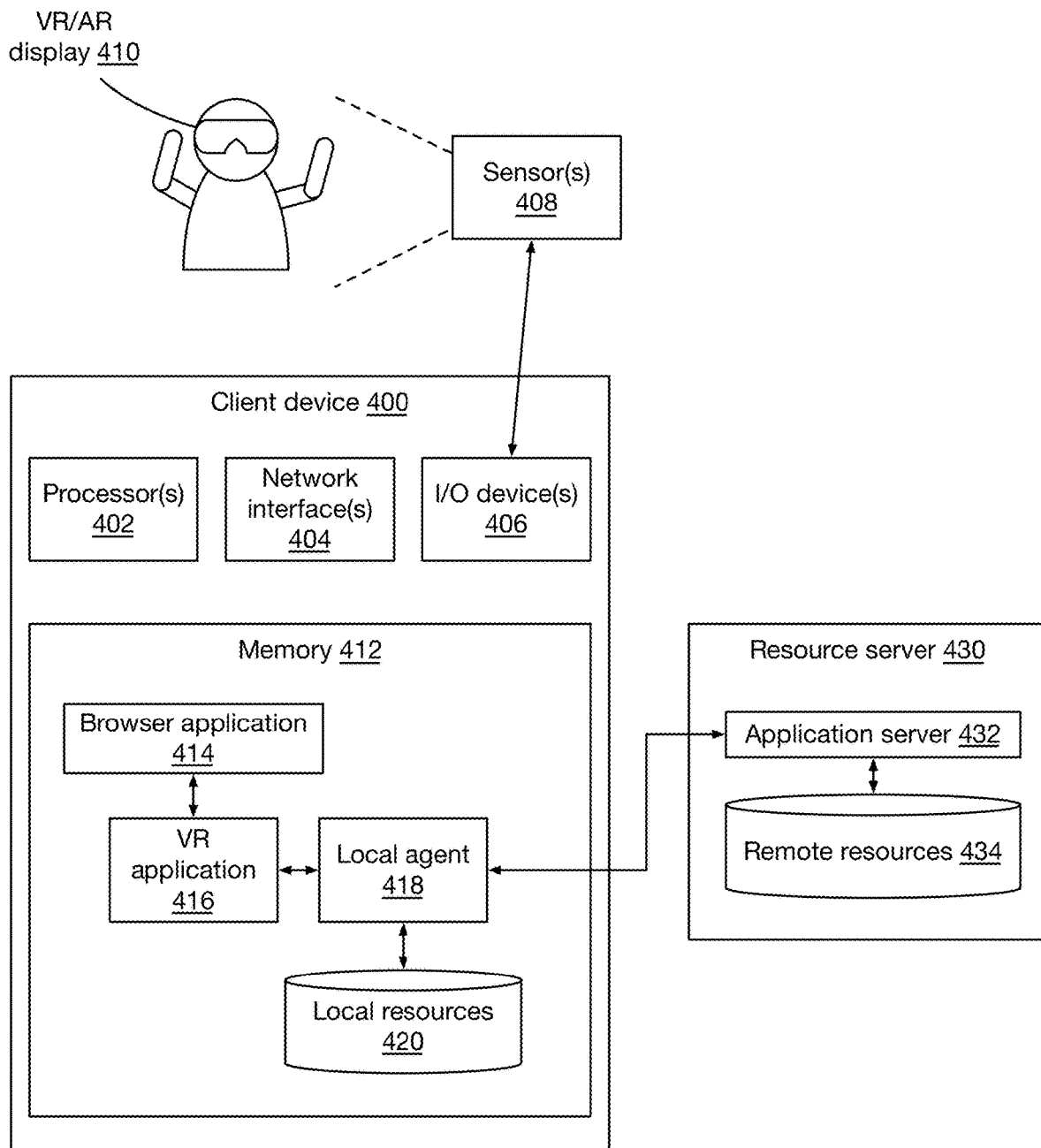
FIG. 4A is a block diagram of a system for providing an interactive virtual reality environment, according to some implementations.

FIG. 4A is a block diagram of a system for providing an interactive virtual reality environment, according to some implementations. A client device 400 may comprise a laptop computer, desktop computer, portable computer, tablet computer, smartphone, video game console, embedded computer, appliance, or any other type and form of computing device for providing a virtual reality environment. In some implementations, client device 400 may comprise a wearable computer, such as a stand-alone or all-in-one virtual reality headset.

Client device 400 may comprise one or more processors 402, network interface 404, and input/output devices 406. Processors 402 may comprise any type and form of processing unit, including central processing units (CPUs), graphics processing units (GPUs), tensor processing units (TPUs), co-processors, ASIC-based processors, or any other such devices for executing logic instructions. Network interfaces 404 may comprise any type and form of interface, including cellular interfaces, wireless interfaces including 802.11 (WiFi), Bluetooth interfaces, Ethernet interfaces, or any other type and form of network interface. Network interface 404 may be used to communicate over a network (not illustrated) such as the Internet to a resource server 430, which may similarly be a computing device comprising one or more processors, network interfaces, and input/output devices (not illustrated). In some implementations, resource server 430 may comprise one or more physical computing devices, such as a server farm; or may comprise one or more virtual computing devices executed by one or more physical computing devices, such as a server cloud.

Client device 400 may comprise or communicate with one or more sensors 408 for tracking movement of a user, and one or more displays including a virtual reality or augmented reality display 410. Although shown separate (e.g. outside-in tracking or tracking by measuring displacement of emitters or reflectors on a headset and/or controllers from separate sensors), in some implementations, sensors 408 and virtual reality/augmented reality display 410 may be integrated (e.g. for inside-out tracking or tracking by measuring translations between successive images of a physical environment taken from sensors on a headset). Various tracking systems may be implemented, including inside-out, outside-in, stereoscopic camera-based tracking, time of flight measurement and tracking, artificial intelligence based tracking, etc. In some implementations, the tracking systems may track the user's head (e.g. position and orientation), the user's hands (e.g. via controllers or image recognition from cameras viewing the hands), and/or any other limbs or appendages of the user.

Client device 400 may include a memory device 412 storing data and applications for execution by processors 402. For example, memory 412 may comprise a browser application 414, which may include a web browser, remote access application, or other such application for selecting, downloading, and launching virtual reality environments or applications. For example, a browser application 414 may be used to log in to a remote server and download a virtual reality training scenario for local storage and execution.

VR application 416 may comprise an application, server, service, daemon, routine, or other executable logic for providing an interactive virtual reality environment and interacting with objects or events within the environment. VR application 416 may comprise a plug-in executed by a browser application 414 or may be a separate application. VR application 416 may execute data files prepared by a developer for an environment or scenario, or may be a stand-alone application compiled by a developer and including configuration details within the application.

Browsers such as browser application 414 are capable of delivering content to users based on a URL, the vast majority of which are composed of static or dynamic Hypertext Markup Language (HTML) pages, interspersed with scripts, rich media and other data. To access the data, a URL is used that is a reference to a web resource, specifying its location on a computer network and a mechanism for retrieving it. The protocol by which the information is accessed can be a common one, such as Hypertext Transfer Protocol (HTTP), Hypertext Transfer Protocol Secure (HTTPS), or File Transfer Protocol (FTP), or it can be a specialized protocol that is handled by an application that is installed on the system and registered to an operating system of the client device 400, such as Titiania Delivery Extended Reality Protocol (TDXR). This allows for the smart delivery of Virtual Reality content, based on specialized packing and unpacking of the content, and handled by an application 416 on the client system.

As discussed above, a VR application 416 or data for such an application may be associated with a configuration construct, which may be downloaded or bundled with the application or separately retrieved from a resource server 430. The configuration construct may map GUIDs of objects within the virtual environment to paths and resource identifiers for retrieval at runtime.

In some implementations, memory 412 may comprise a local agent 418. Local agent 418 may comprise an application, service, server, daemon, routine, plug-in of browser application 414 or VR application 416, or other executable logic for retrieving configuration constructs and resources and providing the resources for display or rendering by an embedded browser or renderer within the VR application 416. Local agent 418 may be referred to variously as an application handler, scheme handler, content delivery agent, linked data platform (LDP) agent, a thin client, a helper program, or by similar terms.

Content may be conditionally delivered based on the status of an individual file, using the locally stored file, if it is the same as that designated by the server location, or downloading the file, if it is not stored locally. The local agent 418 may be configured to launch, find, and download VR experiences or applications 416. The local agent 418 may work in conjunction with a web portal or server provided by an application server 432 (e.g. web server, FTP server, data server, or similar service) of a resource server 430 computing device to provide a seamless user experience between the portal and the host operating system platform. The local agent 418 may comprise a "thin client", providing minimal functionality that cannot be easily provided by a web browser application 414. The local agent may intercept or receive via redirection requests using a private scheme (e.g. com.example.tdxr, as discussed above), and may communicate with an application server 432 for most of its data and business logic, using a representational state transfer (RESTful) API defined for the portal or other communications capabilities. For example, application server 432 may comprise a Linked Data Platform (LDP), or an HTTP server that conforms to the requirements of the LDP specification for providing RESTful interactions (GET, POST, PUT, DELETE, etc.) with resource description framework (RDF) and non-RDF resources. RDF resources can support functionality around ontology, taxonomy, provenance, linking, metadata, and rules, providing greater functionality and flexibility to the system, including search for specific elements (e.g. via ontology or taxonomy based searches, a user may search for and retrieve a virtual training scenario that includes, within metadata of an object, a specified model number or type of equipment (e.g. personal protective equipment or breathing apparatus)).

Local agent 418 may retrieve configuration constructs via application server 432 and stored in remote resources 434, and may store copies of the constructs locally in local resources 420. As discussed above, the local agent 418 may receive requests and may determine whether the resource is available locally, and either provide the local resource or download the remote resource accordingly.

Figure 5A:
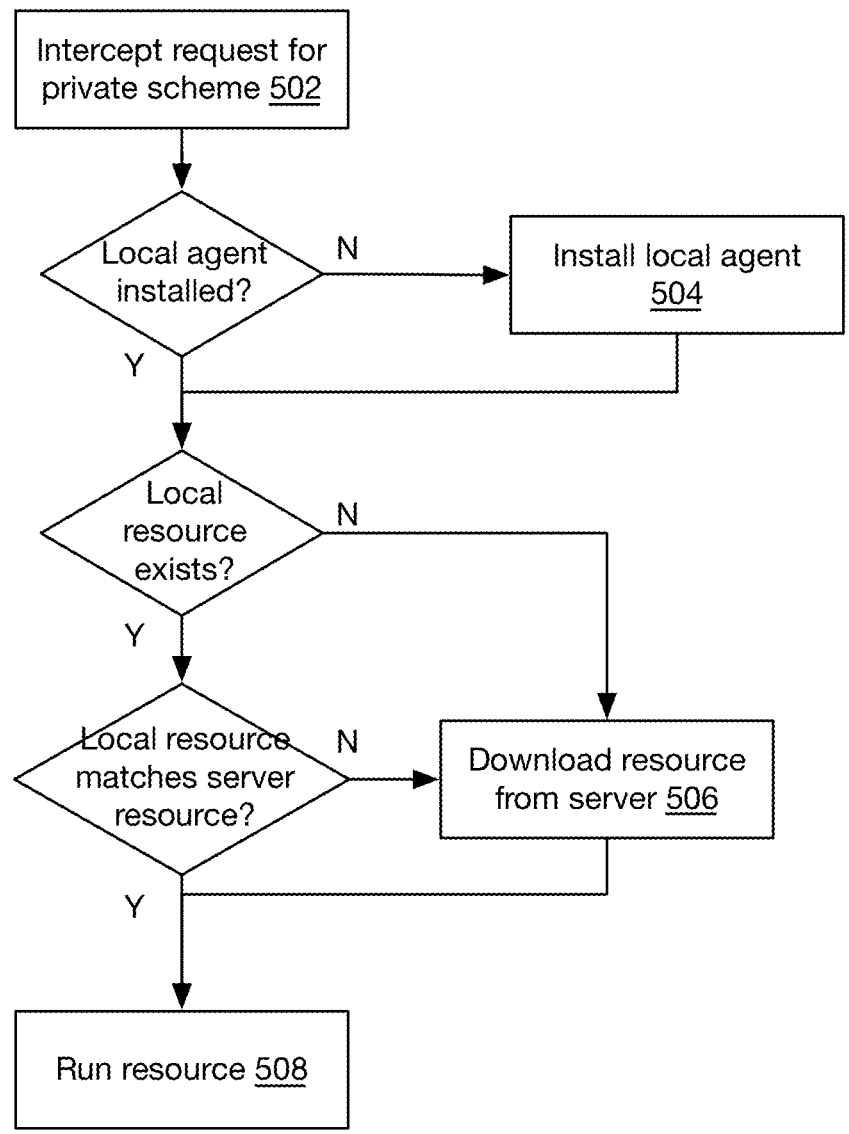
FIG. 5A is a flow chart of a method for launching a virtual reality environment, according to some implementations.

Referring ahead to FIG. 5A, illustrated is a flow chart of a method for launching a virtual reality environment, according to some implementations. At step 502, the local agent may intercept or receive via a redirection by the operating system a request utilizing the private URL scheme. In some implementations, if the local agent is not installed, the request may be received or intercepted by the virtual reality application and/or browser application, and at step 504, the local agent may be downloaded and/or installed.

As discussed above, the request may identify a resource by a GUID or resource identifier and, in some implementations, a portal identifier, project identifier, or other such identifier. The local agent may determine if a local copy of the resource exists, and in some implementations, may compare the local copy to a remote copy to determine whether any updates or modifications have been made (e.g. by transmitting a request comprising an identification of a hash value of the resource or version number or other identifier of the local copy to a server, and either receiving a notification that no updates have been made, or receiving a new copy of the resource). If the resource does not exist locally or if the local version is obsolete, then at step 506, the resource may be retrieved from the remote server. The remote server may be identified via a host identifier in the request or domain as part of the path or address of the resource as discussed above. At step 508, the resource may be run, e.g. by instantiating an embedded browser or renderer within the virtual environment and displaying or rendering the resource within a window of the embedded browser or renderer in the virtual environment.

In some implementations, access to resources may be controlled, and/or resources may be encrypted. Extended reality content may be subject to a number of checks in some implementations to determine the suitability of delivery, e.g. based on one or more of the following factors: whether the client device has an active license for content, whether the user has an active license, whether the delivery portal has an active license, whether the client device and/or user has authorization to access the delivery portal, whether a valid keypair exists for the user, client device, or organization, and whether the user or client device has successfully authenticated with the remote server (e.g. via a username, password, biometric identifier, two-factor authentication scheme, etc.). The encrypted content may be unencrypted and executed only in memory using a just-in-time (JIT) paradigm, and may not be stored locally unencrypted, enforcing access controls in some implementations.

Figure 5B:
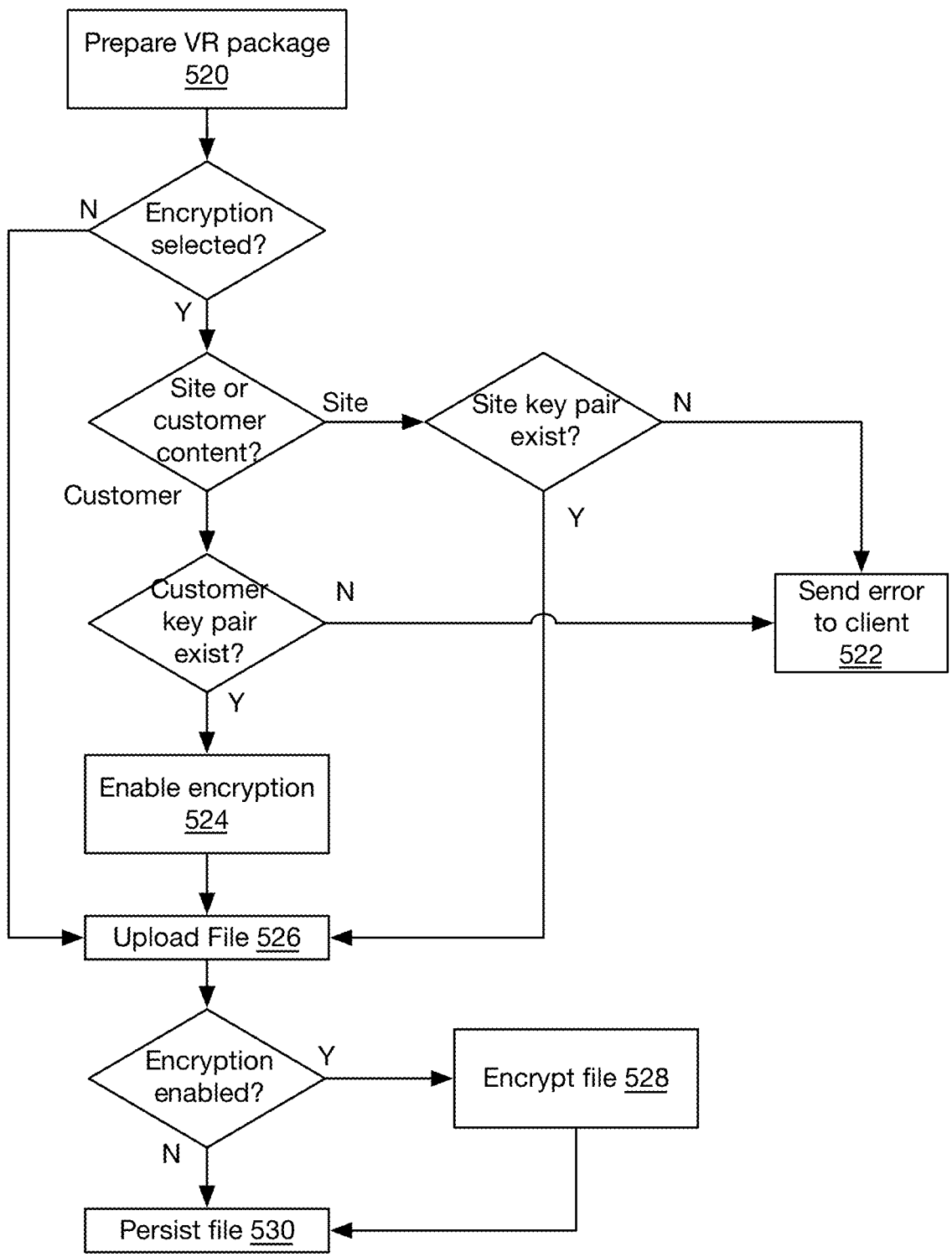
FIG. 5B is a flow chart of a method for providing a secure application deployment, according to some implementations.

FIG. 5B is a flow chart of a method for providing a secure application deployment, according to some implementations. At step 520, a developer may prepare a virtual reality package (e.g. compiled application or data and/or configuration construct), or may prepare a modification to a configuration construct. If encryption is not selected or access controls are disabled, then the package or construct may be uploaded at step 526 and the package or construct persisted at step 530 (e.g. stored or archived for use across multiple sessions, particularly for cloud-based deployments with virtualized application or resource servers). If encryption is selected, then depending on whether the developer is uploading site specific or customer specific content, the system may check for a corresponding encryption key pair. If no key is available, then at step 522, an error may be returned to the client, such that an encryption key may be provided (e.g. sharing of a public key or symmetric encryption key). If the key is available, then encryption may be enabled at step 524. The package or construct may be uploaded at step 526, and at step 528, may be encrypted utilizing the key. The encrypted package or construct may then be persisted at step 530.

As discussed above, in some implementations, virtual environments may be used for training and/or certification. For example, a trainer or skilled user may record a series of interactions with objects within the environment. Their interactions may be played within the environment, e.g. as a virtual or "ghost" avatar, within the view of a second user or student. This may allow the student user to go through the same motions at the same time as the recorded "ghost" avatar, allowing for intuitive learning by copying the instructor. The "ghost" avatar may be displayed in a semi-transparent form in some implementations, such that the user may view their own avatar overlapping or within the "ghost" avatar.

Figure 4B:
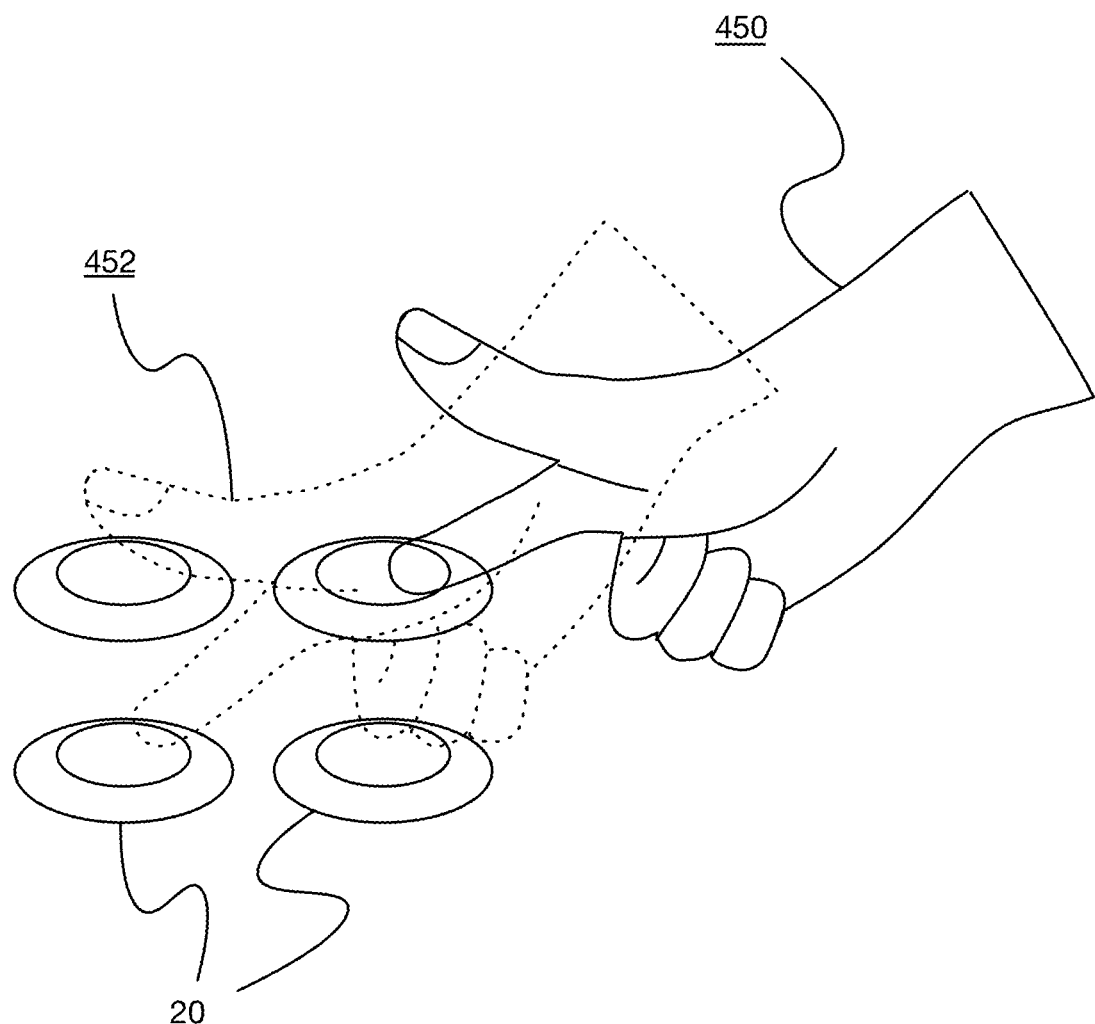
FIG. 4B is an illustration of a virtual reality environment for training and certification, according to some implementations.

For example, returning to FIG. 4B, illustrated is a virtual reality environment for training and certification, according to some implementations. As shown, an avatar of a user may include a hand 450 which may be displayed positioned to correspond to tracking of the user's actual hand or a controller held by their hand. Similarly, a "ghost" avatar 452 following previously recorded tracking information for an instructor's hand or controller may be displayed in the environment, making the same actions as the instructor did. The training user may easily and intuitively identify when they are taking an incorrect action by noting how their movements diverge from the recorded "ghost" avatar.

The same functions may be used for certification purposes by disabling display of the instructor's "ghost" avatar 452. The training user's movements may still be tracked and compared to the instructor's recorded movements, and in some implementations, a score generated to determine the amount of deviation of the training user from the instructor's actions.

For example, FIG. 4C is an example training and certification log for a virtual reality system for training and certification, according to some implementations. The implementation illustrated shows events or interactions with objects within the virtual environment such as buttons and dials, along with a time within the scenario at which the instructor took the action (e.g. a relative time from the start of the scenario, rather than an absolute time), and a time that the user interacted with the object. A distance between a position of the training user and a position of the instructor user when the event or interaction was recorded for the respective user may be determined (e.g. a distance between a position or rotation of a hand of the user when turning a dial, and a position or rotation of a hand of the instructor when turning the same dial), and a score generated. The score may be calculated inversely proportional to the distance in some implementations (e.g. such that smaller distances receive a higher score).

In some implementations, a sequence of interactions may be ordered—that is, the instructor's interactions may be performed in a particular order, and each of the user's interactions may be compared to a corresponding interaction. This may be useful in some implementations in which tasks need be performed in a particular order, or for when a specific object interaction may not be recorded. For example, in one such implementation, if an instructor rotated a dial (e.g. dial 2) as a fourth interaction, and a training user rotated a different dial (e.g. dial 3) as their fourth interaction, the distance between the position of the instructor's hand and the training user's hand may be significant (e.g. on a completely different dial). The distance measurement may automatically account for this. In other implementations, the specific object interacted with or type of interaction may be recorded (e.g. which button is pressed), and the score may be calculated based on its conformity to the proper object or type of interaction, in addition to or instead of distance. Additionally, in some implementations, the score may be adjusted based on a difference between the recorded relative time of the instructor's interaction and the recorded relative time of the training user's interaction. These times may be calculated relative to the start of the scenario in some implementations (e.g. such that penalties for delays are continuously applied, encouraging the training user to speed up to recover after a delay), or may be calculated relative to a previous interaction. For example, in the table shown in FIG. 4C, the instructor took 25 seconds to move from the second to third interaction, and 5 seconds to move from the third to fourth interaction. The training user took 41 seconds and 5 seconds respectively between the corresponding interactions. In such implementations using relative timing between subsequent interactions, the training user's score may be penalized based on the delay between the second and third interactions, but not based on the delay between the third and fourth interactions (despite their overall time being slower). This may avoid over-penalizing the user.

The scores may be totaled, averaged, or otherwise aggregated and compared to a threshold for certification purposes. In some implementations, if the user's aggregated score is below a threshold, the virtual scenario may be automatically restarted, potentially in a training or guided mode, to provide further instruction.

Figure 4D:
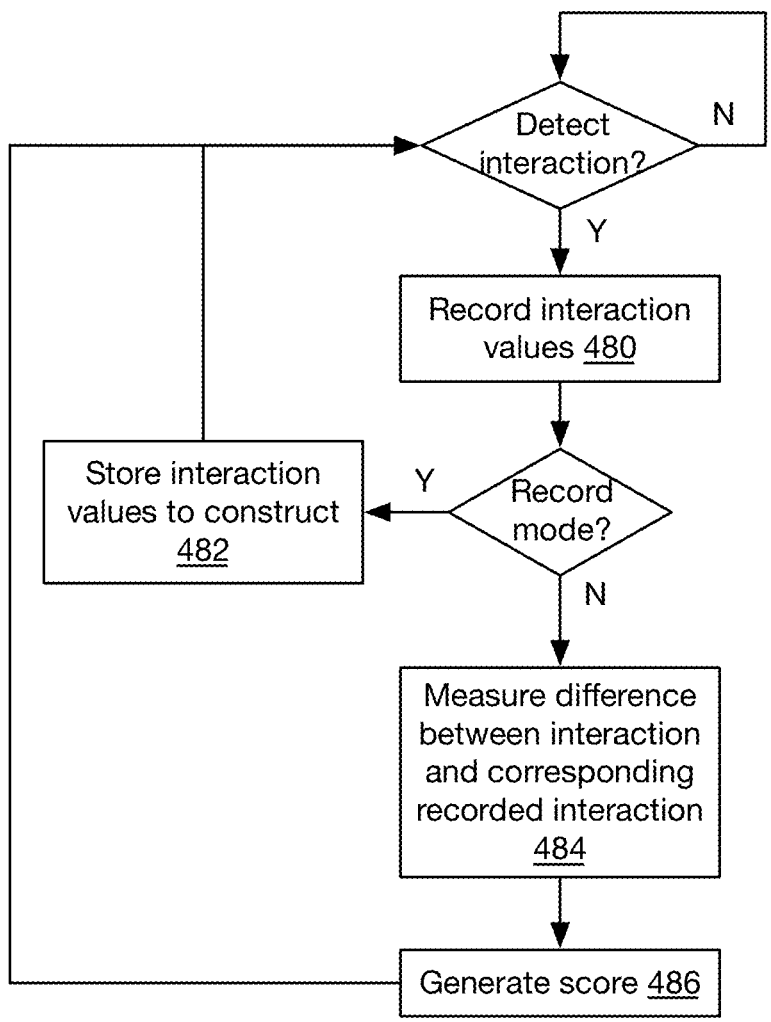
FIG. 4D is a flow chart of a method for virtual reality-based training and certification, according to some implementations.

FIG. 4D is a flow chart of a method for virtual reality-based training and certification, according to some implementations. Upon detection of an interaction, the values for the interaction may be recorded at step 480 (e.g. relative time, object interacted with, a value for the object in some implementations such as a dial setting or switch position, position of the user, position of the user's hand or hands, or any other such information to save a state of the simulation at the time of the interaction). If the simulation is in a record mode (e.g. for an instructor), the values may be stored to a configuration construct at step 482 or in metadata of the objects. If the simulation is not in a record mode, at step 484, a difference between a previously recorded interaction and the new interaction may be compared (e.g. including differences in positions, timing, settings, objects, or any other data). At step 486, a score may be generated based on the difference, such as inversely proportional to the difference such that higher accuracy results in a higher score. During the simulation and/or once the simulation is complete, depending on implementation, the scores for interactions may be aggregated and compared to a threshold. If the scores fall below the threshold, a notification may be displayed and the simulation automatically restarted, either in the same mode or a training or guided mode as discussed above.

Accordingly, the systems and methods discussed herein provide for a dynamic, reconfigurable virtual reality environment with in-environment access to external data and resources. Implementations of these systems also provide an external mechanism for modifying other aspects of the virtual reality experience with no need to recode or compile the experience. This can alter the primary flow of the experience, change its behavior based on the specific user accessing it and add branded or customer-specific aspects to the application. The same level or environment can provide drastically different experiences for various users from beginners through experts, even allowing the option of random or ordered events, controllable by an instructor or administrator, through simple configuration.

In one aspect, the present disclosure is directed to a method for providing context-sensitive dynamic links within a virtual environment. The method includes receiving, by a computing device, data specifying a virtual environment associated with a context and comprising at least one virtual object, each of the at least one virtual objects associated with an identifier. The method also includes, for each of the at least one virtual objects, retrieving, by the computing device from a database according to the context associated with the virtual environment, an address of a resource associated with the corresponding identifier. The method also includes displaying, by the computing device, a view of the virtual environment. The method also includes detecting, by the computing device, an interaction with a first virtual object by a user of the virtual environment. The method also includes identifying, by the computing device, an address of a first resource associated with an identifier of the first virtual object. The method also includes instantiating, by the computing device within the virtual environment, an embedded browser or renderer, the embedded browser or renderer retrieving the first resource at the address and displaying the retrieved resource within the virtual environment.

In some implementations, the context is associated with a node in a multi-layer hierarchy. In a further implementation, the first virtual object is associated with a first identifier at a first layer in the multi-layer hierarchy and a second identifier at a second layer in the multi-layer hierarchy; and retrieving the address of the first virtual object further comprises retrieving the address associated with the first identifier, responsive to the first layer being lower than the second layer. In another further implementation, the context is associated with a node at each layer in the multi-layer hierarchy, with each node having a parent or child relationship to another node of the context at another layer in the multi-layer hierarchy.

In some implementations, the address of the first resource comprises an address in a private uniform resource identifier (URI) scheme having a host identifier, a portal identifier, and a resource identifier. In a further implementation, instantiating the embedded browser or renderer further comprises determining whether a copy of the first resource exists within a local storage library corresponding to the portal identifier. In a still further implementation, instantiating the embedded browser or renderer further comprises retrieving a copy of the first resource from a remote storage library corresponding to the host identifier, responsive to a determination that a copy of the first resource does not exist within the local storage library corresponding to the portal identifier.

In some implementations, the address of the first resource comprises an identifier of an execution action; and the embedded browser or renderer processes the first resource based on the identified execution action. In some implementations, each virtual object is associated with a set of coordinates within the virtual environment; and displaying the view of the virtual environment further comprises displaying one or more virtual objects within the view at their respective associated coordinates. In a further implementation, each virtual object is associated with a display mode; and displaying the view of the virtual environment further comprises displaying a subset of the virtual objects having associated display modes corresponding to a current display mode of the virtual environment.

In another aspect, the present disclosure is directed to a system for providing context-sensitive dynamic links within a virtual environment. The system includes a computing device comprising a processor. The processor is configured to: receive data specifying a virtual environment associated with a context and comprising at least one virtual object, each of the at least one virtual objects associated with an identifier; for each of the at least one virtual objects, retrieve, from a database according to the context associated with the virtual environment, an address of a resource associated with the corresponding identifier; display a view of the virtual environment; detect an interaction with a first virtual object by a user of the virtual environment; identify an address of a first resource associated with an identifier of the first virtual object; and instantiate, within the virtual environment, an embedded browser or renderer, the embedded browser or renderer retrieving the first resource at the address and displaying the retrieved resource within the virtual environment.

In some implementations, the context is associated with a node in a multi-layer hierarchy. In a further implementation, the first virtual object is associated with a first identifier at a first layer in the multi-layer hierarchy and a second identifier at a second layer in the multi-layer hierarchy; and the processor is further configured to retrieve the address associated with the first identifier, responsive to the first layer being lower than the second layer. In another further implementation, the context is associated with a node at each layer in the multi-layer hierarchy, with each node having a parent or child relationship to another node of the context at another layer in the multi-layer hierarchy.

In some implementations, the address of the first resource comprises an address in a private uniform resource identifier (URI) scheme having a host identifier, a portal identifier, and a resource identifier. In a further implementation, the processor is further configured to determine whether a copy of the first resource exists within a local storage library corresponding to the portal identifier. In a still further implementation, the processor is further configured to retrieve a copy of the first resource from a remote storage library corresponding to the host identifier, responsive to a determination that a copy of the first resource does not exist within the local storage library corresponding to the portal identifier.

In some implementations, the address of the first resource comprises an identifier of an execution action; and the embedded browser or renderer processes the first resource based on the identified execution action. In some implementations, each virtual object is associated with a set of coordinates within the virtual environment; and the processor is further configured to display one or more virtual objects within the view at their respective associated coordinates. In a further implementation, each virtual object is associated with a display mode; and the processor is further configured to display a subset of the virtual objects having associated display modes corresponding to a current display mode of the virtual environment.

In another aspect, the present disclosure is directed to a method for providing virtual environment-based training and certification. The method includes (a) tracking, by a sensor of a computing device, a position of a user within a physical environment; (b) displaying, by the computing device via a virtual reality display to the user, an avatar corresponding to the tracked position of the user within a virtual environment; (c) detecting, by the computing device, an interaction of the avatar with a virtual object within the virtual environment; (d) measuring, by the computing device, a difference between the detected interaction and a predetermined interaction associated with the virtual object; and (e) generating, by the computing device, a score inversely proportional to the measured difference.

In some implementations, the method includes repeating steps (c)-(e) for a sequence of interactions; and aggregating the generated scores. In a further implementation, the sequence of detected interactions corresponds to a sequence of predetermined interactions having a predetermined order. In a still further implementation, the method includes adjusting the aggregated score responsive to the sequence of detected interactions having a different order than the sequence of predetermined interactions. In another further implementation, the method includes comparing the aggregated score to a threshold; and repeating steps (a)-(e) responsive to the aggregated score being below the threshold. In yet another further implementation, the method includes comparing a time between a first detected interaction and a subsequent detected interaction, and a time between corresponding predetermined interactions, and adjusting the generated score for the subsequent detected interaction based on the comparison of the times.

In some implementations, the method includes measuring a difference between the tracked position of the user and a recorded tracked position of a second user corresponding to the predetermined interaction. In a further implementation, the method includes tracking a hand position of the user, and measuring a difference between the tracked hand position of the user and a recorded tracked position of a hand of the second user.

In some implementations, the method includes displaying, within the virtual environment, the predetermined interaction associated with the virtual object as a second avatar. In a further implementation, the method includes recording the predetermined interaction while tracking, by the sensor of the computing device, a position of a second user within the physical environment.

In another aspect, the present disclosure is directed to a system for providing virtual environment-based training and certification. The system includes a computing device comprising at least one sensor and a processor and in communication with a virtual reality display. The processor is configured to: (a) track, via the sensor, a position of a user within a physical environment; (b) display, via the virtual reality display to the user, an avatar corresponding to the tracked position of the user within a virtual environment; (c) detect an interaction of the avatar with a virtual object within the virtual environment; (d) measure a difference between the detected interaction and a predetermined interaction associated with the virtual object; and (e) generate a score inversely proportional to the measured difference.

In some implementations, the processor is further configured to repeat steps (c)-(e) for a sequence of interactions; and aggregate the generated scores. In a further implementation, the sequence of detected interactions corresponds to a sequence of predetermined interactions having a predetermined order. In a still further implementation, the processor is further configured to adjust the aggregated score responsive to the sequence of detected interactions having a different order than the sequence of predetermined interactions. In another further implementation, the processor is further configured to compare the aggregated score to a threshold; and repeat steps (a)-(e) responsive to the aggregated score being below the threshold. In yet another further implementation, the processor is further configured to compare a time between a first detected interaction and a subsequent detected interaction, and a time between corresponding predetermined interactions, and adjust the generated score for the subsequent detected interaction based on the comparison of the times.

In some implementations, the processor is further configured to measure a difference between the tracked position of the user and a recorded tracked position of a second user corresponding to the predetermined interaction. In a further implementation, the processor is further configured to track a hand position of the user, and measure a difference between the tracked hand position of the user and a recorded tracked position of a hand of the second user.

In some implementations, the processor is further configured to display, within the virtual environment, the predetermined interaction associated with the virtual object as a second avatar. In a further implementation, the processor is further configured to record the predetermined interaction while tracking, by the sensor of the computing device, a position of a second user within the physical environment.

In another aspect, the present disclosure is directed to a method for securely providing dynamic virtual environments. The method includes displaying, by a web browser application of a computing device, a web page having a selectable link comprising a private uniform resource identifier (URI) scheme, a host identifier, a portal identifier, and a resource identifier. The method also includes instantiating, by the computing device, a local agent responsive to a selection of the link. The method also includes determining, by the local agent, that a copy of a first resource corresponding to the resource identifier does not exist within a local storage library at an address corresponding to the portal identifier. The method also includes retrieving, by the local agent, a copy of the first resource from a remote storage library corresponding to the host identifier, responsive to the determination that a copy of the first resource does not exist within the local storage library corresponding to the portal identifier. The method also includes extracting, by the local agent, configuration information for a virtual environment. The method also includes launching, by the local agent, the virtual environment according to the extracted configuration information.

In some implementations, the method includes: transmitting a query to a database server comprising an identification of metadata associated with a virtual object; and receiving, from the database server, the web page for display, the web page generated by the database server responsive to an identification of the metadata associated with the virtual object in configuration information for a virtual environment corresponding to the portal identifier and resource identifier.

In some implementations, the method includes decrypting the retrieved copy of the first resource. In a further implementation, the method includes providing authentication information associated with the computing device to the remote server. In another further implementation, the retrieved copy of the first resource is decrypted in active memory and flushed from active memory after termination of the virtual environment. In a still further implementation, the retrieved encrypted copy of the first resource is stored within the local storage library after termination of the virtual environment without decryption.

In some implementations, the configuration information comprises metadata for a subset of virtual objects within the virtual environment, and the method includes, for each virtual object: determining whether the configuration information either comprises metadata for the virtual object, or does not comprise metadata for the virtual object; and respectively either adding metadata from the configuration information for the virtual object into the virtual environment, or adding default metadata associated with one of the host identifier or portal identifier for the virtual object into the virtual environment. In a further implementation, the metadata for a virtual object comprises a URI scheme, the host identifier, the portal identifier, and a second resource identifier corresponding to a second resource comprising information about the virtual object. In another further implementation, the method includes displaying each virtual object within the virtual environment. In some implementations, the method includes registering the private URI scheme as associated with the local agent with an operating system of the computing device; and instantiating the local agent responsive to generating a request, by the web browser, using the private URI scheme.

In another aspect, the present disclosure is directed to a system for securely providing dynamic virtual environments. The system includes a computing device comprising a memory device storing a local storage library, a network interface, and a processor. The processor is configured to: display, via a web browser application, a web page having a selectable link comprising a private uniform resource identifier (URI) scheme, a host identifier, a portal identifier, and a resource identifier; instantiate a local agent responsive to a selection of the link; determine, via the local agent, that a copy of a first resource corresponding to the resource identifier does not exist within the local storage library at an address corresponding to the portal identifier; retrieve, via the network interface, a copy of the first resource from a remote storage library corresponding to the host identifier, responsive to the determination that a copy of the first resource does not exist within the local storage library corresponding to the portal identifier; extract, via the local agent, configuration information for a virtual environment; and launch, by the local agent, the virtual environment according to the extracted configuration information.

In some implementations, the processor is further configured to: transmit, via the network interface, a query to a database server comprising an identification of metadata associated with a virtual object; and receive, from the database server, the web page for display, the web page generated by the database server responsive to an identification of the metadata associated with the virtual object in configuration information for a virtual environment corresponding to the portal identifier and resource identifier.

In some implementations, the processor is further configured to decrypt the retrieved copy of the first resource. In a further implementation, the processor is further configured to provide authentication information associated with the computing device to the remote server. In another further implementation, the retrieved copy of the first resource is decrypted in active memory and flushed from active memory after termination of the virtual environment. In a still further implementation, the retrieved encrypted copy of the first resource is stored within the local storage library after termination of the virtual environment without decryption.

In some implementations, the configuration information comprises metadata for a subset of virtual objects within the virtual environment, and the processor is further configured to, for each virtual object: determine whether the configuration information either comprises metadata for the virtual object, or does not comprise metadata for the virtual object; and respectively either add metadata from the configuration information for the virtual object into the virtual environment, or add default metadata associated with one of the host identifier or portal identifier for the virtual object into the virtual environment. In a further implementation, the metadata for a virtual object comprises a URI scheme, the host identifier, the portal identifier, and a second resource identifier corresponding to a second resource comprising information about the virtual object. In another further implementation, the processor is further configured to display each virtual object within the virtual environment. In some implementations, the processor is further configured to register the private URI scheme as associated with the local agent with an operating system of the computing device; and instantiate the local agent responsive to generating a request, by the web browser, using the private URI scheme.

B. Computing Environment

Having discussed specific embodiments of the present solution, it may be helpful to describe aspects of the operating environment as well as associated system components (e.g., hardware elements) in connection with the methods and systems described herein.

Figure 6A:
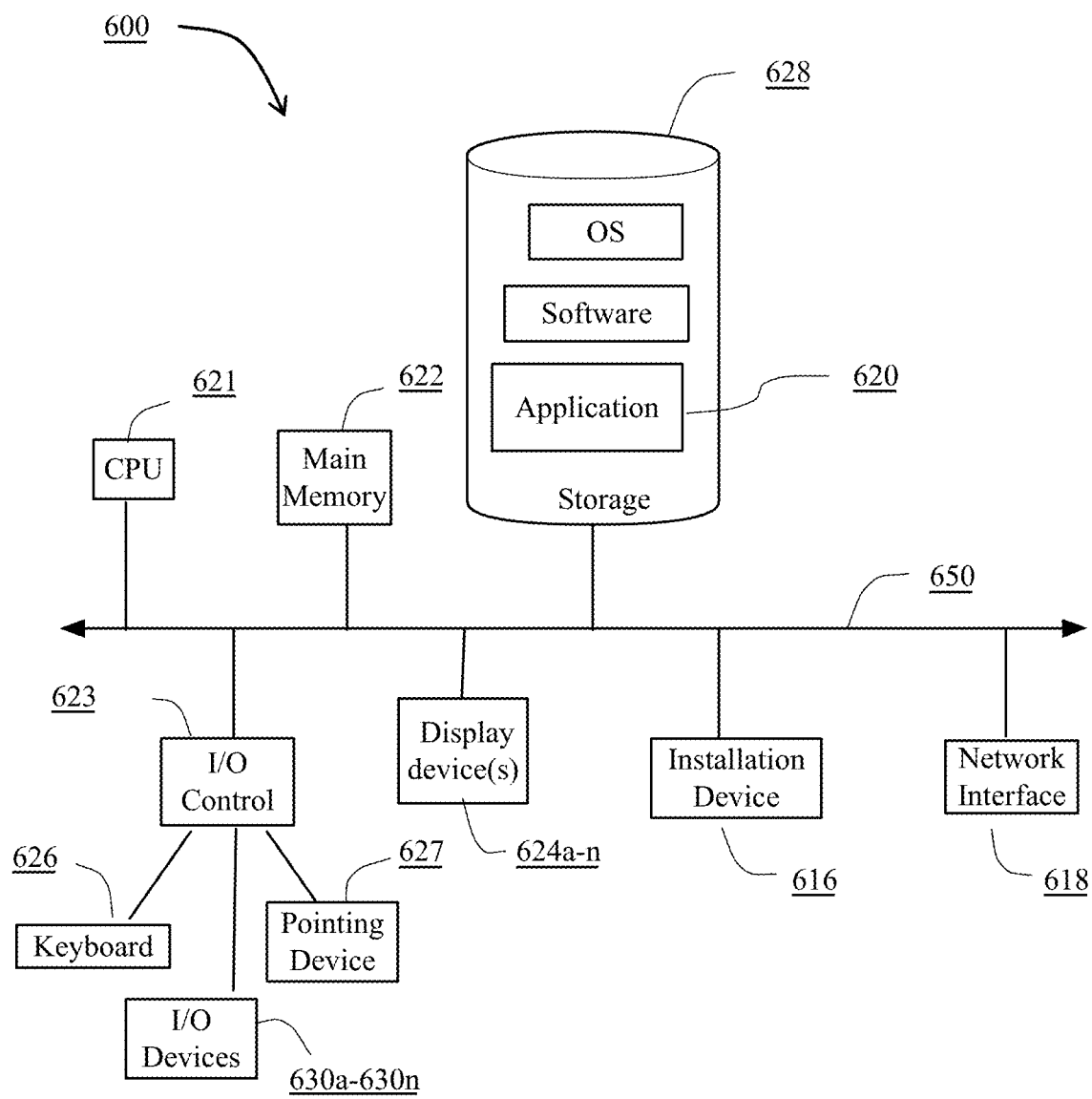
FIGS. 6A and 6B are block diagrams depicting embodiments of computing devices useful in connection with the methods and systems described herein.
Figure 6B:
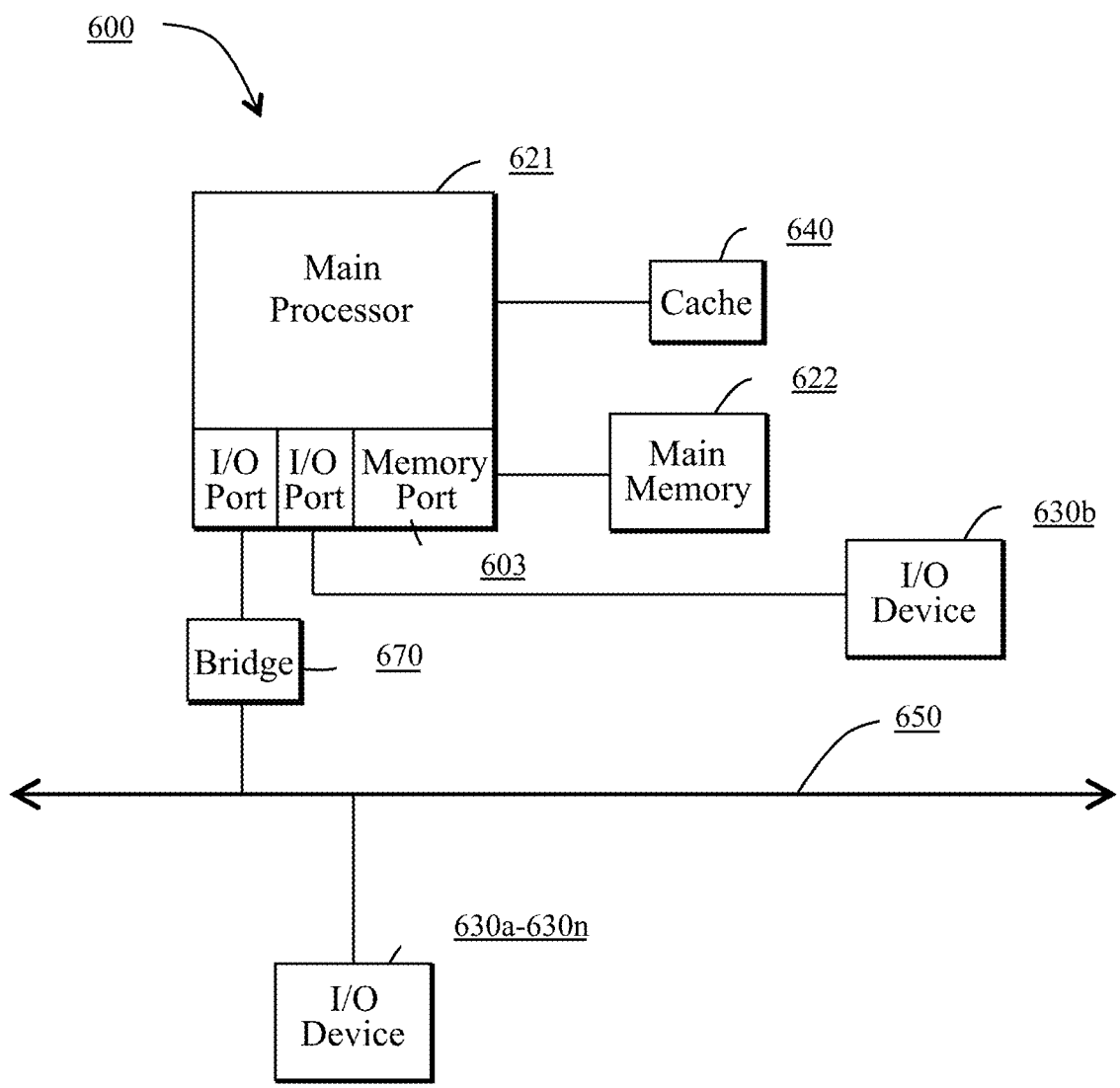

The systems discussed herein may be deployed as and/or executed on any type and form of computing device, such as a computer, network device or appliance capable of communicating on any type and form of network and performing the operations described herein. FIGS. 6A and 6B depict block diagrams of a computing device 600 useful for practicing an embodiment of the wireless communication devices 602 or the access point 606. As shown in FIGS. 6A and 6B, each computing device 600 includes a central processing unit 621, and a main memory unit 622. As shown in FIG. 6A, a computing device 600 may include a storage device 628, an installation device 616, a network interface 618, an I/O controller 623, display devices 624a-624n, a keyboard 626 and a pointing device 627, such as a mouse. The storage device 628 may include, without limitation, an operating system and/or software. As shown in FIG. 6B, each computing device 600 may also include additional optional elements, such as a memory port 603, a bridge 670, one or more input/output devices 630a-630n (generally referred to using reference numeral 630), and a cache memory 640 in communication with the central processing unit 621.

The central processing unit 621 is any logic circuitry that responds to and processes instructions fetched from the main memory unit 622. In many embodiments, the central processing unit 621 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device 600 may be based on any of these processors, or any other processor capable of operating as described herein.

Main memory unit 622 may be one or more memory chips capable of storing data and allowing any storage location to be directly accessed by the microprocessor 621, such as any type or variant of Static random access memory (SRAM), Dynamic random access memory (DRAM), Ferroelectric RAM (FRAM), NAND Flash, NOR Flash and Solid State Drives (SSD). The main memory 622 may be based on any of the above described memory chips, or any other available memory chips capable of operating as described herein. In the embodiment shown in FIG. 6A, the processor 621 communicates with main memory 622 via a system bus 650 (described in more detail below). FIG. 6B depicts an embodiment of a computing device 600 in which the processor communicates directly with main memory 622 via a memory port 603. For example, in FIG. 6B the main memory 622 may be DRDRAM.

FIG. 6B depicts an embodiment in which the main processor 621 communicates directly with cache memory 640 via a secondary bus, sometimes referred to as a backside bus. In other embodiments, the main processor 621 communicates with cache memory 640 using the system bus 650. Cache memory 640 typically has a faster response time than main memory 622 and is provided by, for example, SRAM, BSRAM, or EDRAM. In the embodiment shown in FIG. 6B, the processor 621 communicates with various I/O devices 630 via a local system bus 650. Various buses may be used to connect the central processing unit 621 to any of the I/O devices 630, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 624, the processor 621 may use an Advanced Graphics Port (AGP) to communicate with the display 624. FIG. 6B depicts an embodiment of a computer 600 in which the main processor 621 may communicate directly with I/O device 630b, for example via HYPERTRANSPORT, RAPIDIO, or INFINIBAND communications technology. FIG. 6B also depicts an embodiment in which local busses and direct communication are mixed: the processor 621 communicates with I/O device 630a using a local interconnect bus while communicating with I/O device 630b directly.

A wide variety of I/O devices 630a-630n may be present in the computing device 600. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 623 as shown in FIG. 6A. The I/O controller may control one or more I/O devices such as a keyboard 626 and a pointing device 627, e.g., a mouse or optical pen. Furthermore, an I/O device may also provide storage and/or an installation medium 616 for the computing device 600. In still other embodiments, the computing device 600 may provide USB connections (not shown) to receive handheld USB storage devices such as the USB Flash Drive line of devices manufactured by Twintech Industry, Inc. of Los Alamitos, Calif.

Referring again to FIG. 6A, the computing device 600 may support any suitable installation device 616, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 600 may further include a storage device, such as one or more hard disk drives or redundant arrays of independent disks, for storing an operating system and other related software, and for storing application software programs such as any program or software 620 for implementing (e.g., configured and/or designed for) the systems and methods described herein. Optionally, any of the installation devices 616 could also be used as the storage device. Additionally, the operating system and the software can be run from a bootable medium.

Furthermore, the computing device 600 may include a network interface 618 to interface to the network 604 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 600 communicates with other computing devices 600' via any type and/or form of gateway or tunneling protocol such as Secure Socket Layer (SSL) or Transport Layer Security (TLS). The network interface 618 may include a built-in network adapter, network interface card, PCMCIA network card, card bus network adapter, wireless network adapter, USB network adapter, modem or any other device suitable for interfacing the computing device 600 to any type of network capable of communication and performing the operations described herein.

In some embodiments, the computing device 600 may include or be connected to one or more display devices 624a-624n. As such, any of the I/O devices 630a-630n and/or the I/O controller 623 may include any type and/or form of suitable hardware, software, or combination of hardware and software to support, enable or provide for the connection and use of the display device(s) 624a-624n by the computing device 600. For example, the computing device 600 may include any type and/or form of video adapter, video card, driver, and/or library to interface, communicate, connect or otherwise use the display device(s) 624a-624n. In one embodiment, a video adapter may include multiple connectors to interface to the display device(s) 624a-624n. In other embodiments, the computing device 600 may include multiple video adapters, with each video adapter connected to the display device(s) 624a-624n. In some embodiments, any portion of the operating system of the computing device 600 may be configured for using multiple displays 624a-624n. One ordinarily skilled in the art will recognize and appreciate the various ways and embodiments that a computing device 600 may be configured to have one or more display devices 624a-624n.

In further embodiments, an I/O device 630 may be a bridge between the system bus 650 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 600 of the sort depicted in FIGS. 6A and 6B may operate under the control of an operating system, which control scheduling of tasks and access to system resources. The computing device 600 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 8 and 10, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 600 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 600 has sufficient processor power and memory capacity to perform the operations described herein.

In some embodiments, the computing device 600 may have different processors, operating systems, and input devices consistent with the device. For example, in one embodiment, the computing device 600 is a smart phone, mobile device, tablet or personal digital assistant. In still other embodiments, the computing device 600 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 600 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A method for providing context-sensitive dynamic links within a virtual environment, comprising:
   receiving, by a computing device, data specifying a virtual environment associated with a context and comprising at least one virtual object, each of the at least one virtual objects associated with an identifier, the context associated with a node in a multi-layer hierarchy;
   for each of the at least one virtual objects, retrieving, by the computing device from a database according to the context associated with the virtual environment, an address of a resource associated with the corresponding identifier;
   displaying, by the computing device, a view of the virtual environment;
   detecting, by the computing device, an interaction with a first virtual object by a user of the virtual environment, wherein the first virtual object is associated with a first identifier at a first layer in the multi-layer hierarchy and a second identifier at a second layer in the multi-layer hierarchy;
   selecting, by the computing device, the first identifier rather than the second identifier, responsive to the first layer being lower than the second layer in the multi-layer hierarchy;
   identifying, by the computing device, an address of a first resource associated with the first identifier of the first virtual object, responsive to the selection of the first identifier; and
   instantiating, by the computing device within the virtual environment, rendering of the data of the first resource, the renderer retrieving the first resource at the address and displaying the retrieved resource within the virtual environment.

2. The method of claim 1, wherein the context is associated with a node at each layer in the multi-layer hierarchy, with each node having a parent or child relationship to another node of the context at another layer in the multi-layer hierarchy.

3. The method of claim 1, wherein the address of the first resource comprises an address in a private uniform resource identifier (URI) scheme having a host identifier, a portal identifier, and a resource identifier.

4. The method of claim 1, wherein the address of the first resource comprises an identifier of an execution action; and wherein the renderer processes the first resource based on the identified execution action.

5. The method of claim 1, wherein each virtual object is associated with a set of coordinates within the virtual environment; and wherein displaying the view of the virtual environment further comprises displaying one or more virtual objects within the view at their respective associated coordinates.

6. The method of claim 5, wherein each virtual object is associated with a display mode; and wherein displaying the view of the virtual environment further comprises displaying a subset of the virtual objects having associated display modes corresponding to a current display mode of the virtual environment.

7. A method for providing context-sensitive dynamic links within a virtual environment, comprising:
   receiving, by a local computing device, data specifying a virtual environment associated with a context and comprising at least one virtual object, each of the at least one virtual objects associated with an identifier;
   for each of the at least one virtual objects, retrieving, by the local computing device from a database according to the context associated with the virtual environment, an address of a resource associated with the corresponding identifier;
   displaying, by the local computing device, a view of the virtual environment;
   detecting, by the local computing device, an interaction with a first virtual object by a user of the virtual environment;
   identifying, by the local computing device, an address of a first resource associated with an identifier of the first virtual object, the address of the first resource comprising an address in a private uniform resource identifier (URI) scheme having a host identifier, a portal identifier, and a resource identifier, wherein the host identifier is associated with a remote storage library stored in memory of a remote computing device, and wherein the portal identifier is associated with a local storage library stored in memory of the local computing device;

determining, by the local computing device, whether a copy of the first resource exists within the local storage library corresponding to the portal identifier; and instantiating, by the computing device within the virtual environment, rendering of the data of the first resource, the renderer retrieving the first resource at the address and displaying the retrieved resource within the virtual environment.

8. The method of claim 7, wherein instantiating the rendering further comprises retrieving a copy of the first resource from a remote storage library corresponding to the host identifier, responsive to a determination that a copy of the first resource does not exist within the local storage library corresponding to the portal identifier.

9. A system for providing context-sensitive dynamic links within a virtual environment, comprising:

a computing device comprising a processor, the processor configured to:

receive data specifying a virtual environment associated with a context and comprising at least one virtual object, each of the at least one virtual objects associated with an identifier, for each of the at least one virtual objects, retrieve, from a database according to the context associated with the virtual environment, an address of a resource associated with the corresponding identifier, display a view of the virtual environment, detect an interaction with a first virtual object by a user of the virtual environment, wherein the first virtual object is associated with a first identifier at a first layer in the multi-layer hierarchy and a second identifier at a second layer in the multi-layer hierarchy, select the first identifier rather than the second identifier, responsive to the first layer being lower than the second layer in the multi-layer hierarchy;

identify an address of a first resource associated with the first identifier of the first virtual object, responsive to the selection of the first identifier, and instantiate, within the virtual environment, a renderer, the renderer retrieving the first resource at the address and displaying the retrieved resource within the virtual environment.

10. The system of claim 9, wherein the context is associated with a node at each layer in the multi-layer hierarchy, with each node having a parent or child relationship to another node of the context at another layer in the multi-layer hierarchy.

11. The system of claim 9, wherein the address of the first resource comprises an address in a private uniform resource identifier (URI) scheme having a host identifier, a portal identifier, and a resource identifier.

12. The system of claim 9, wherein the address of the first resource comprises an identifier of an execution action; and wherein the renderer processes the first resource based on the identified execution action.

13. The system of claim 9, wherein each virtual object is associated with a set of coordinates within the virtual environment; and wherein the processor is further configured to display one or more virtual objects within the view at their respective associated coordinates.

14. The system of claim 13, wherein each virtual object is associated with a display mode; and wherein the processor is further configured to display a subset of the virtual objects having associated display modes corresponding to a current display mode of the virtual environment.

15. A system for providing context-sensitive dynamic links within a virtual environment, comprising:

a local computing device comprising a processor, the processor configured to:

receive data specifying a virtual environment associated with a context and comprising at least one virtual object, each of the at least one virtual objects associated with an identifier, for each of the at least one virtual objects, retrieve, from a database according to the context associated with the virtual environment, an address of a resource associated with the corresponding identifier, display a view of the virtual environment, detect an interaction with a first virtual object by a user of the virtual environment, identify an address of a first resource associated with an identifier of the first virtual object, the address of the first resource comprising an address in a private uniform resource identifier (URI) scheme having a host identifier, a portal identifier, and a resource identifier, wherein the host identifier is associated with a remote storage library stored in memory of a remote computing device, and wherein the portal identifier is associated with a local storage library stored in memory of the local computing device, determine whether a copy of the first resource exists within the local storage library corresponding to the portal identifier, and instantiate, within the virtual environment, a renderer, the renderer retrieving the first resource at the address and displaying the retrieved resource within the virtual environment.

16. The system of claim 15, wherein the processor is further configured to retrieve a copy of the first resource from a remote storage library corresponding to the host identifier, responsive to a determination that a copy of the first resource does not exist within the local storage library corresponding to the portal identifier.

* * * * *